United States Patent
Majumdar et al.

(10) Patent No.: US 10,318,798 B2
(45) Date of Patent: Jun. 11, 2019

(54) DEVICE AND METHOD FOR DETECTING NON-VISIBLE CONTENT IN A NON-CONTACT MANNER

(71) Applicant: BOOZ ALLEN HAMILTON INC., McLean, VA (US)

(72) Inventors: Zigurts K. Majumdar, Washington, DC (US); Paul C. D'Angio, Arlington, VA (US); Michael A. Papazoglou, Chapel Hill, NC (US); Allan Steinhardt, Vienna, VA (US); Christopher Hutchens, Leesburg, VA (US)

(73) Assignee: BOOZ ALLEN HAMILTON INC., McLean, VA (US)

( * ) Notice: Subject to any disclaimer, the term of this patent is extended or adjusted under 35 U.S.C. 154(b) by 626 days.

(21) Appl. No.: 14/796,343

(22) Filed: Jul. 10, 2015

(65) Prior Publication Data
US 2017/0011259 A1    Jan. 12, 2017

(51) Int. Cl.
*G06K 9/00* (2006.01)
*G01B 11/14* (2006.01)
*G06T 7/262* (2017.01)

(52) U.S. Cl.
CPC .......... *G06K 9/00335* (2013.01); *G01B 11/14* (2013.01); *G06T 7/262* (2017.01); *G06T 2207/30232* (2013.01)

(58) Field of Classification Search
CPC ............... G06K 9/00335; G06T 7/262; G06T 2207/30232; G01B 11/14
USPC ......................................... 348/136
See application file for complete search history.

(56) References Cited

U.S. PATENT DOCUMENTS

| | | | |
|---|---|---|---|
| 6,370,481 B1 | 4/2002 | Gamble | |
| 7,019,641 B1 | 3/2006 | Lakshmanan et al. | |
| 8,817,096 B1 * | 8/2014 | Ni | G01S 17/89 348/144 |
| 2007/0013509 A1 | 1/2007 | Lakshmanan et al. | |

(Continued)

OTHER PUBLICATIONS

The International Search Report and the Written Opinion of the International Searching Authority (Forms PCT/ISA/210 and PCT/ISA/237) dated Mar. 31, 2017, by the Commissioner for Patent in corresponding International Application No. PCT/US2016/041240. (12 pages).

(Continued)

*Primary Examiner* — Mohammed S Rahaman
*Assistant Examiner* — Jimmy S Lee
(74) *Attorney, Agent, or Firm* — Buchanan Ingersoll & Rooney PC

(57) ABSTRACT

A method and device are provided for detecting non-visible content of an object in a non-contact manner. The device includes a light source configured to emit light toward a surface of an object over a period of time. The device also includes an optical sensing component configured to receive a pattern of light from the surface of the object, and to record the received pattern at plural points in time. In addition, the device includes a processing component configured to determine temporal changes in the pattern during the plural points in time, and to detect whether motion is present in the object based on determined temporal changes in the pattern, where the motion represents a frequency source of non-visible content in the object.

29 Claims, 13 Drawing Sheets

(56) References Cited

U.S. PATENT DOCUMENTS

| | | | | |
|---|---|---|---|---|
| 2010/0226543 A1* | 9/2010 | Zalevsky | ............... | A61B 5/024 |
| | | | | 382/107 |
| 2012/0309532 A1* | 12/2012 | Ambrus | ............... | G06F 3/0425 |
| | | | | 463/36 |
| 2013/0271590 A1* | 10/2013 | Saint Clair | ............ | A61B 5/015 |
| | | | | 348/77 |
| 2015/0243043 A1* | 8/2015 | Guan | ........................ | G06T 7/20 |
| | | | | 701/1 |
| 2016/0078286 A1* | 3/2016 | Tani | ................... | G06K 9/00778 |
| | | | | 348/143 |
| 2016/0198961 A1* | 7/2016 | Homyk | ................ | A61B 5/0082 |
| | | | | 600/476 |

OTHER PUBLICATIONS

J.C. Dainty, "The Statistics of Speckle Patters", E. Wolf, Progress in Optics XIV ©, North-Holland, 1976, pp. 1-46.

Bjarke Rose, et al., "Laser-speckle angular-displacement sensor: theoretical and experimental study", vol. 37, No. 11, Apr. 10, 1998, pp. 2119-2129.

Richard Szeliski, "Image Alignment and Stitching: A Tutorial", Vo. 2, No. 1, 2006, pp. 1-105.

* cited by examiner

FIG. 5
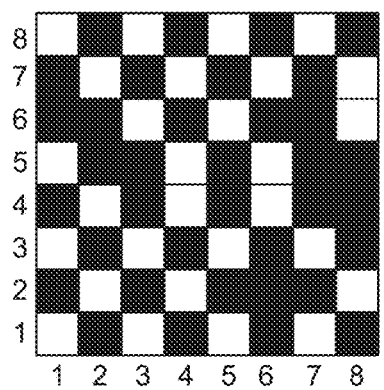
Pattern 1
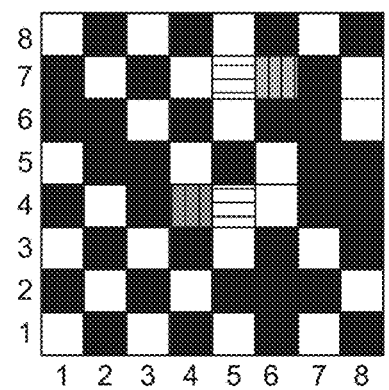
Pattern 2
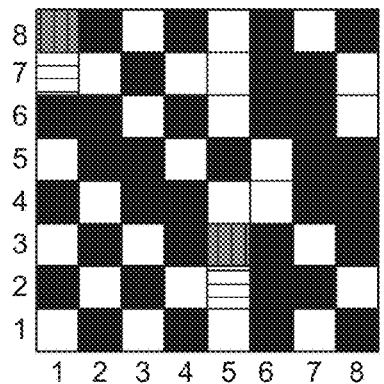
Pattern 3
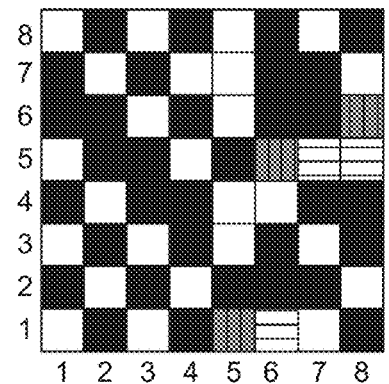
Pattern n
▨ Segment changes from light intensity to dark intensity
▤ Segment changes from dark intensity to light intensity

DEVICE AND METHOD FOR DETECTING NON-VISIBLE CONTENT IN A NON-CONTACT MANNER

STATEMENT ON FEDERALLY SPONSORED RESEARCH

At least part of the present disclosure was made with government support under contract number W911QX14D001 awarded by the U.S. Department of the Army. However, the U.S. Department of the Army does not have any rights in this application.

FIELD

The present disclosure relates to a device and method for detecting the presence of non-visible content of an object in a non-contact manner, at a predetermined distance from the object and without being in physical contact with the object.

For instance, exemplary embodiments of the present disclosure provide a device and method for detecting the presence of one or more human beings within an object such as a vehicle in a non-contact manner, even when the presence of the human being(s) is not visible and/or cannot be heard from outside the object.

BACKGROUND

Detecting the presence of a human being when he or she cannot be seen or heard is an ongoing issue in many situations including disaster relief, hostage crises, kidnapping, human trafficking, correctional facilities, etc. In the case of detecting the presence of a human being in a vehicle, known systems and methods exist that detect vibrations due to the human heartbeat without having to open the vehicle. See, e.g., U.S. Pat. Nos. 6,370,481, and 7,019,641. However, these known systems and methods involve the use of sensors that have to be in physical contact with the vehicle and other noise subtraction sensors which are placed on the ground around the vehicle. Thus, the known systems and methods involve the use of sensors which have to be in physical contact with the object to be investigated.

SUMMARY

An exemplary embodiment of the present disclosure provides a device for detecting non-visible content of an object in a non-contact manner. The exemplary device includes a light source configured to emit light toward a surface of an object over a period of time. The exemplary device also includes an optical sensing component configured to receive a pattern of light from the surface of the object, and to record the received pattern at plural points in time. In addition, the exemplary device includes a processing component configured to determine temporal changes in the pattern during the plural points in time, and to detect whether motion is present in the object based on determined temporal changes in the pattern, where the motion represents a frequency source of non-visible content in the object.

An exemplary embodiment of the present disclosure provides a method for detecting non-visible content of an object in a non-contact manner. The exemplary method includes emitting light from a light source toward a surface of an object over a period of time. The exemplary method also includes receiving, by an optical sensing component, a pattern of light from the surface of the object, and to record the received pattern at plural points in time. In addition, the exemplary method includes determining, by a processor of a computer processing device, temporal changes in the pattern during the plural points in time, and detecting, by the processor, whether motion is present in the object based on determined temporal changes in the pattern, where the motion represents a frequency source of non-visible content in the object.

An exemplary embodiment of the present disclosure provides a non-transitory computer-readable recording medium having a computer program tangibly recorded thereon that, when executed by a processor of a computer processing device, causes the processor to carry out operations for detecting non-visible content of an object in a non-contact manner. The exemplary operations include emitting light toward a surface of an object over a period of time, and receiving a pattern of light from the surface of the object, and to record the received pattern at plural points in time. The exemplary operations also include determining temporal changes in the pattern during the plural points in time, and detecting whether motion is present in the object based on determined temporal changes in the pattern, where the motion represents a frequency source of non-visible content in the object.

An exemplary embodiment of the present disclosure provides a device for detecting non-visible content of an object in a non-contact manner. The exemplary device includes a light source configured to emit light toward a surface of an object over a period of time. In addition, the exemplary device includes an optical sensing component configured to receive a pattern of light from the surface of the object, and to record the received pattern at plural points in time. The exemplary device also includes a processing component configured to define the pattern recorded at at least one of the plural points in time as a reference pattern, to determine temporal changes in the pattern during the plural points in time by comparing the pattern during the plural points in time with the reference pattern, and to detect whether motion is present in the object when determined temporal changes in the pattern differ a predetermined amount the reference pattern, the motion representing non-visible content in the object.

BRIEF DESCRIPTION OF THE DRAWINGS

Additional refinements, advantages and features of the present disclosure are described in more detail below with reference to exemplary embodiments illustrated in the drawings, in which:

FIG. 5 includes exemplary representations of different image patterns to illustrate an image registration operation performed by the processing component of the device illustrated in FIG. 1, according to an exemplary embodiment of the present disclosure;

Figure 1:
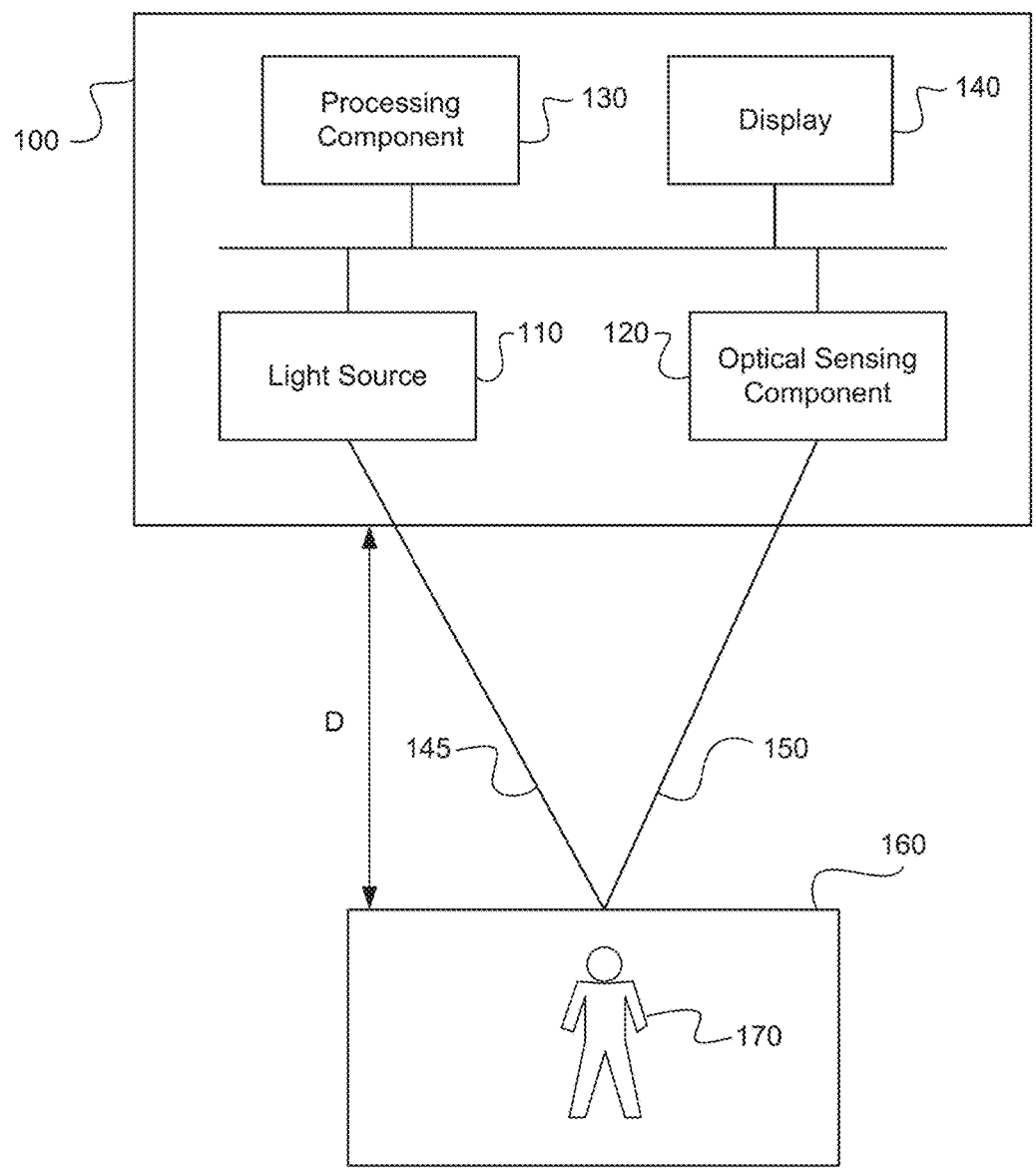
FIG. 1 is a block diagram of a device detecting non-visible contents of an object in a non-contact manner, according to an exemplary embodiment of the present disclosure.

In the drawings, identical or similarly functioning parts are denoted with the same reference symbols, unless otherwise noted. It is to be noted that components illustrated in the drawings are not shown to scale and may be shown in an exploded perspective to provide an explanatory description of such components.

DETAILED DESCRIPTION

Exemplary embodiments of the present disclosure provide a device and method for detecting non-visible content of an object in a non-contact manner. For instance, exemplary embodiments of the present disclosure provide a device and method for detecting the presence of one or more human beings within an object such as a vehicle in a non-contact manner, even when the presence of the human being(s) is not visible and/or cannot be heard from outside the object.

FIG. 1 is a block diagram of a device 100 for detecting the presence of non-visible content 170 (e.g., one or more persons) of an object 160 in a non-contact manner, according to an exemplary embodiment of the present disclosure. As used herein, the term "non-visible" means unable to be perceived visually by a human being without the use of visual enhancement devices that are not naturally part of the human being's body. The term "content" means a living being capable of movement, or the motion of an article such as a non-visible vehicle, for example. As will be described in further detail below, the non-visible content is detected based on an inference which is deduced from observed movement of the non-visible content over a processing interval, which is a selectable period of observation (e.g., a definable period such as five minutes, twenty minutes, one hour, etc.). The term "non-contact" means not in physical contact, independent of any electromagnetic energy emitted from the device which may contact the object. In the example of FIG. 1, the device 100 is illustrated as being spaced a predetermined distance D (e.g., 25 feet) away from the object 160 to be investigated and is thereby not in physical contact with the object 160. The device 100 includes a light source 110 configured to emit light 145 (e.g., laser light) toward a surface of the object 160. For example, in case the object 160 is a vehicle such as a car or truck, the light source 110 can be configured to emit light 145 at the license plate of the vehicle. It is to be understood that this is an example, and the present disclosure is not limited thereto. The light source 110 of the device 100 can emit the light 145 toward any unobstructed surface, or a portion of the surface, of an object 160 undergoing inspection. The light source 110 is configured to emit the light 145 toward the surface of the object 160 for a predetermined period of time. The period of time can be several seconds, several minutes or several hours, as desired.

In the exemplary embodiment of FIG. 1, the device 100 includes an optical sensing component 120 configured to receive a pattern of light 150 from the surface of the object (e.g., light reflected from the surface of the object). As used herein, the term "pattern of light" means the light waves received by (i.e., incident on) the optical sensing component 120 at a particular point in time. The "pattern of light" may change between different points in time based on motion of the object 160 and/or motion in the object 160 being investigated. Thus, the pattern of light at one point in time (e.g., time=1 second) may be different from the pattern of light received at another point in time (e.g., time=5 seconds), and different from the pattern of light received at yet another point in time (e.g., time=15 seconds). The light 150 received from the surface of the object contains a representation of the portion of the surface of the object 160 from which the light 150 was received. For example, the received light 150 can represent the surface roughness of the portion of the surface of the object 160 from which the light 150 was received. The optical sensing component 120 is configured to record the received pattern at plural points in time (e.g., several seconds, several minutes or several hours, as desired). The plural points in time represent a processing interval during which the object 160 is being observed. In accordance with an exemplary embodiment, the optical sensing component 120 can be a camera (e.g., a CCD or CMOS camera), a displacement and/or velocity sensor (e.g., a laser Doppler vibrometer), including a lateral displacement sensor, photodiodes, photomultiplier tubes, as well as other sensors that can detect light incident thereon. The optical sensing component 120 can be configured to record individual images in succession (e.g., at a specified frame rate) and/or record consecutive video segments.

In accordance with an exemplary embodiment, the light source 110 can be any type of laser (e.g., gas lasers, chemical lasers, semiconductor lasers, dye lasers, metal-vapor lasers, solid-state lasers, ion lasers, quantum well laser, free-electron laser, gas dynamic laser, etc.), light-emitting diode (e.g., superluminescent diodes), or other electric powered light source. The light source 110 can be configured to filter ambient light to improve its coherence. The creation of a pattern (e.g., a speckle pattern) in the light 150 received from the surface of an object 160 depends primarily on the coherence of the light source 110, but is affected by other factors, such as the diameter and focal length of the sensor (e.g., detector lens) of the optical sensing component 120, the diameter of the spot on the object 160 (i.e., the area of the object 160 on which the light 145 is emitted), and the surface roughness of the object 160. Various researches have described the relationship between the properties of the light source coherence, light receiver (e.g., lens of a camera) and object required to create speckle patterns, and the influence of these parameters on speckle contrast. See, e.g., J. C. Dainty, "The Statistics of Speckle Patterns," Edited by E. Wolf, Progress in Optics XIV (1976), and B. Rose et al., "Laser-Speckle Angular-Displacement Sensor: Theoretical and Experimental Study," Applied Optics, v. 37, n. 11, pp. 2119-2129 (1998). The entire contents of the aforementioned J. C. Dainty and B. Rose et al. documents are incorporated by reference herein in their entireties. In practice, laser diodes or other light sources having a spectral bandwidth greater than 20 nm and a divergence angle greater than 10 degrees can be used even on visibly shiny surfaces with a surface roughness less than one-fifth the wavelength of the light used (e.g., 655 nm (+/−10 nm) laser light with a less than 100 nm surface roughness) and a commercial off-the-shelf camera or even a low-cost, single lens element followed by an image sensor such as a CCD or CMOS. The influence of the parameters on the speckle properties can be utilized to tune the device performance for different applications and scenarios, such as a varying distance from the object. Accordingly, in view of such parameters, the light source 110 should have a sufficient degree of coherence on the surface of the object 160 such that light received from the surface represents features (e.g., optical roughness) of the portion of the surface from the light was received. For example, the light source 110 may be a laser diode having a wavelength of 650 nm and 4.5 mW of output power. The more coherent the light 145 emitted from the light source 110 is, more detail about the surface of the object 160 will be able to be determined from the light 150 received from the surface of the object 160.

As illustrated in FIG. 1, the exemplary device 100 also includes a processing component 130 configured to determine temporal changes in the pattern during the plural points in time in which the received pattern of light 150 is recorded. The processing component 130 is also configured to detect whether motion is present in the object 160 based on determined temporal changes in the pattern. As used herein, the "motion" that is detected by the processing component 130 represents a frequency source of non-visible content in the object 160. As used herein, the term "frequency source" means an object which experiences or produces an event (e.g., heartbeat) that has a temporal frequency or cycle. For example, the processing component 130 can detect periodic motion such as the heartbeat of a human being located in the object 160 based on temporal changes in the pattern of light 150 representing the surface properties of the object 160. Another example of a frequency source with respect to a human being is the periodic cycle of breathing. As used herein, the term "during the plural points in time" means at least two points in time within the range of the plural points in which the received pattern of light 150 is recorded. For example, if the received pattern of light 150 is recorded for a period of 180 seconds, the term "during" is intended to include any segment within that 180 second period, including the beginning and end of the period. The motion that is detected by the processing component 130 may represent bulk motion within the object 160. As used herein, the term "bulk motion" means the motion of a first object relative to the measured or represented motion of a second object in which the first object is contained and/or transported. For example, with reference to FIG. 1, the term "bulk motion" may represent the motion of the human being 170 (first object) relative to the measured or represented motion of an object 160 such as a vehicle, shipping container, etc.

The exemplary device 100 of FIG. 1 can also include a display 140 configured to display the received pattern of light 140 at any particular point in time and/or a representation of the detection of motion in the object 160 by the processing component 130.

Figure 2:
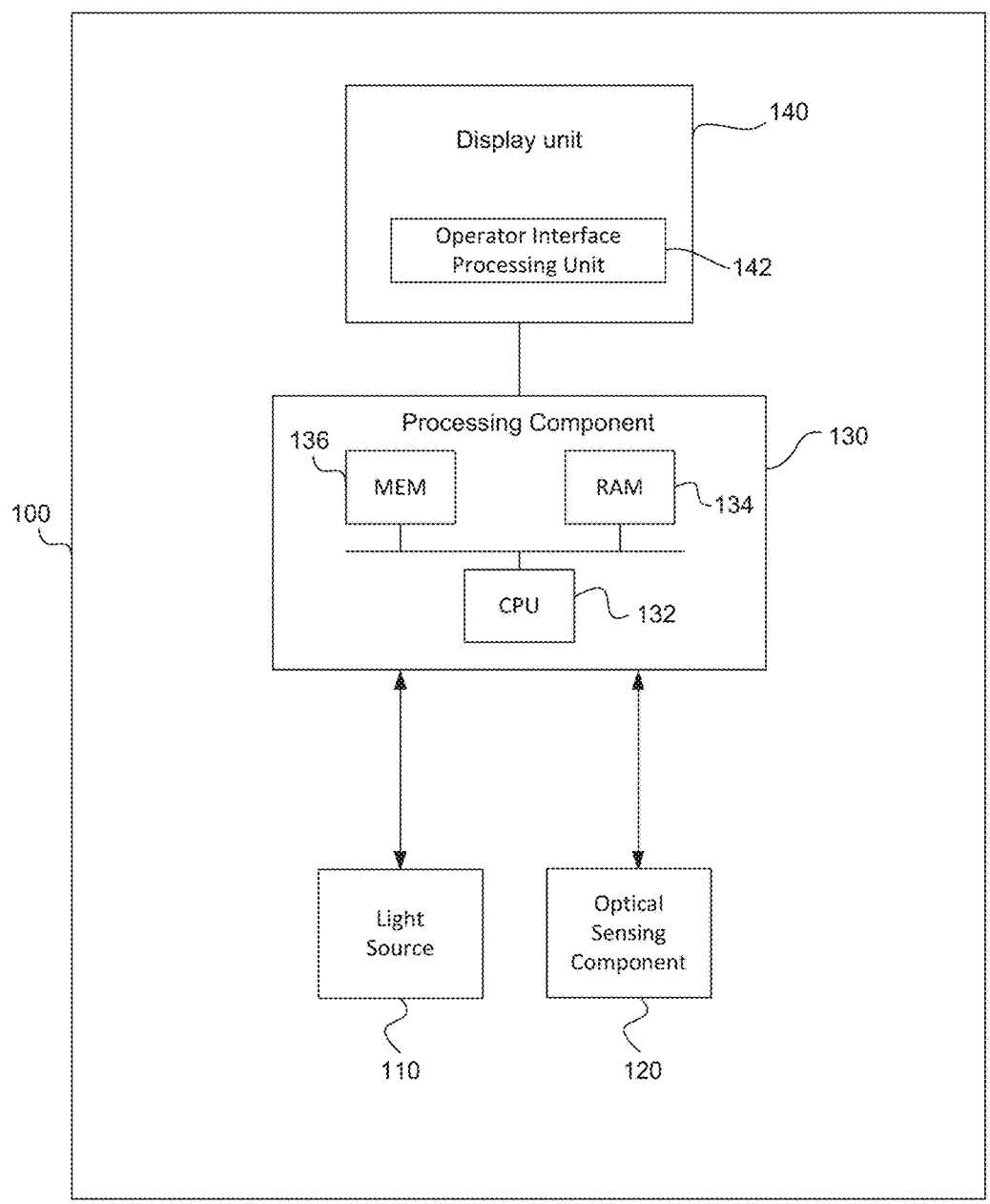
FIG. 2 is an exploded block diagram illustrating constituent features of a processing component and display of the device illustrated in FIG. 1 in more detail.

FIG. 2 is an exploded block diagram illustrating constituent features of the above-described processing component 130 and display 140 of the device 100 in more detail. The processing component 130 includes a computer processor (CPU) 132 that is configured to control the operations of the device 100 as described herein, as well as communications between the components of the device 100. According to an exemplary embodiment, the computer processor 132 may be, for example, (i) a general-purpose processor executing the x86 instruction set such as those processors produced by Intel® or AMD®, or (ii) a general-purpose processor executing other common instruction sets including ARM®, Power ISA®, and MIPS®. Alternatively, the computer processor 132 may be an application specific processor such as an application-specific integrated circuit (ASIC), a programmable logic controller (PLC), a field-programmable gate array (FPGA), or a Digital Signal Control (DSC) processor. In some instances, the computer processor 132 may be included in a System-on-a-Chip (SOC) that includes other aspects of the device such as the components needed to communicate with the other components of the device 100 as described herein. In other instances, multiple discrete processors with different capabilities, including the exemplary processors described above, may cooperate to effectively operate as a single computer processor 132. In the example of FIG. 2, the processing component 130 is illustrated as including a non-transitory, non-volatile memory (MEM) 136 on which a computer program and/or computer-readable instructions is/are tangibly recorded. The processor 132 is configured to execute the program and/or instructions recorded on the memory 136 to carry out the operations and functions of the device 100 as described herein. For example, the processor 132 is configured to identify a plurality of segments in the pattern recorded by the optical sensing component 120, register the identified segments with time and/or frame information, and calculate temporal changes in the pattern during plural points in time in which the pattern is recorded to determine motion in the object based on the determined temporal changes, as will be described in more detail below. In connection with the above-described identification of segments in the pattern, the processor 132 can instruct the MEM 136 to record therein the identified segments for each pattern in association with corresponding information such as position, time and/or frame information. In addition, the MEM 136 can have stored therein corresponding algorithms for performing the segment identification processing and/or determining of temporal changes in the patterns. The processing component 130 can also include a working memory such as a random access memory (RAM) 134 to utilize while performing its functions. The RAM 134 and MEM 136 can be provided separately from the processor 132, for example, in a different physical unit from the processor 132. The MEM 136 may be any type of non-transitory, non-volatile memory such as a read only memory (ROM), hard disk drive, flash memory, optical memory, etc.

In FIG. 2, the device 100 is illustrated as including an operator interface processing unit 142. The operator interface processing unit 142 is configured to display user-selectable operation instructions and any other information for the operation of the device 100. In the example of FIG. 2, the operator interface processing unit 142 is illustrated as being comprised in the display 140. For example, the operator interface processing unit 142 could be a touch-screen display in which a user can enter input commands via the display 140. However, it is conceived that the operator interface processing unit 142 may be provided separate from the display 142 and include physical input means such as keys, trackpads, buttons, etc.

For clarity of illustration, the light source 110, optical sensing component 120, processing component 130, display 140 and operator interface processing unit 142 are illustrated in FIGS. 1 and 2 as being contained within a single housing of the device 100. The present disclosure is not limited to this configuration. One or more of the light source 110, optical sensing component 120, processing component 130, display 140 and operator interface processing unit 142 can be provided in separate housings from each other.

An exemplary embodiment of the device of FIG. 1 will be described below with the light source 110 as a laser diode having a set wavelength (e.g., 650 nm) and output power (e.g., 4.5 mw), and with the optical sensing component 120 as a video camera having a set resolution (e.g., 1920×1080 per frame) and frame rate (e.g., 162 frames per second (fps)). The optical sensing component 120 can also include a connection interface (e.g., USB 3.0) for high-bandwidth video capture. It is to be understood that these are examples, and the present disclosure is not limited thereto.

Figure 3:
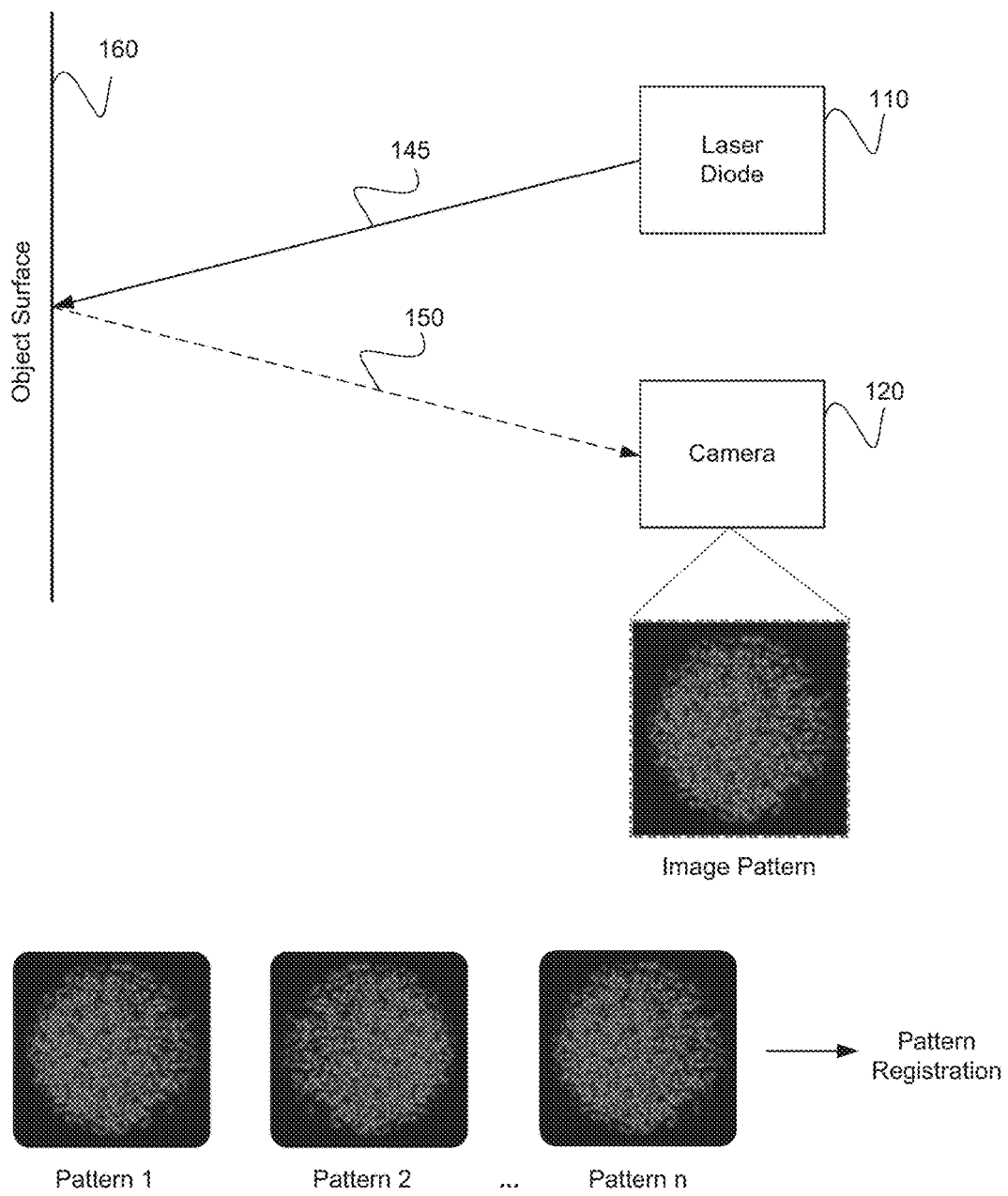
FIG. 3 is an exploded block diagram illustrating an operation of a light source and optical receiving component of the device illustrated in FIG. 1 to receive a pattern of light from a surface of an object, according to an exemplary embodiment of the present disclosure.

FIG. 3 is an exploded block diagram illustrating an exemplary operation of the above-described laser diode and video camera to receive a pattern of light from the surface of the object 160. In the exemplary embodiment of FIG. 3, the optical sensing component 120 is configured to record, as the pattern, an interference pattern of light 150 (e.g., a speckle pattern) received from the surface of the object, and to record a plurality of images of the interference pattern at the plural points in time. In FIG. 3, plural points in time are represented as different frames, each constituting a different image. In the example of FIG. 3, the illustrated image patterns are each images of a speckle pattern based on the light 150 received from the surface of the object. As used herein, the term "image" means a representation of the pattern of light received by the optical sensing component 120 at a particular point in time. Based on the frame rate of the optical sensing component 120, the optical sensing component 120 can thus record multiple images for each second during the period of time in which the optical sensing component 120 is recording the pattern of light 150 received from the object 160. For example, in case the optical sensing component 120 has a frame rate of 162 fps and the optical sensing component records the pattern for a period of 180 seconds, the optical sensing component 120 can record 29,160 images of the pattern (162×180=29,160). In accordance with an exemplary embodiment, the interference pattern respectively captured in each image represents a speckle pattern, which is an intensity pattern produced by the mutual interference of a set of wavefronts depending on the wavelength of the laser light 145 emitted from the light source 110. The image patterns illustrated in FIG. 3 represent speckle patterns at different points in time. Motion of the surface of the object or tilt causes translation of the observed speckle pattern. According to this exemplary embodiment, speckle pattern translation is captured within the pattern images recorded by the optical sensing component 120, and the processing component 130 in turn is configured to determine whether motion is present in the object based on determined temporal changes in the speckle patterns over the period of time, where the motion represents a frequency source of non-visible content in the object. For example, the frequency source can be a beating heartbeat of a human being having an observable frequency. As noted above, another example of a frequency source with respect to a human being is the periodic cycle of breathing. Another example includes observable frequencies such as movement (e.g., walking) of a human being inside an object to be inspected.

The present disclosure is not limited to determining temporal changes in the pattern of light 150 received from the object 160 based on periodic events of a human being. For example, the present disclosure can detect periodic motion such as vibrations in inanimate objects over a processing interval. Examples of such periodic motion include, but are not limited to, vibrations in underground tunneling equipment due to motion in the tunnels and/or motion near the tunnels (e.g., in the ground above the tunnels), vibrations in a structural component due to motion in the vicinity of the structural component (e.g., a vehicle travelling near a telephone pole and causing vibrations in the telephone pole as the vehicle approaches and travels past the telephone pole), vibrations from vehicle engines, etc. It is to be understood that these are examples and the present disclosure is not limited thereto. As described herein, the processing component 130 is configured to determine temporal changes in the pattern of light 150 received from the object 160 during the plural points in time of the processing interval, and to detect whether motion is present in the object 160 based on determined temporal changes in the pattern, where the motion represents a periodic frequency source of non-visible content in the object 160.

In accordance with an exemplary embodiment, the optical sensing component 120 is configured to record the plurality of images of the interference pattern within an image frame (e.g., the image frame of the camera 120 in FIG. 3) at the plural points in time. In accordance with the exemplary embodiment of FIG. 3, the processing component 130 is configured to determine the temporal changes in the interference pattern by comparing the plurality of images and calculating changes in position of the interference pattern in the image frame between the plurality of images.

In accordance with an exemplary embodiment, the processing component 130 is configured to perform an image registration operation for each image to assist in determining whether there is motion present in the object 160 based on determined temporal changes in the pattern of light 150 received from the object 160. For example, the processing component 130 is configured to identify a plurality of segments (e.g., pixels) in each of the images, respectively, and calculate changes in position in the interference pattern by calculating changes in position of corresponding identified segments in the plurality of images.

Figure 4:
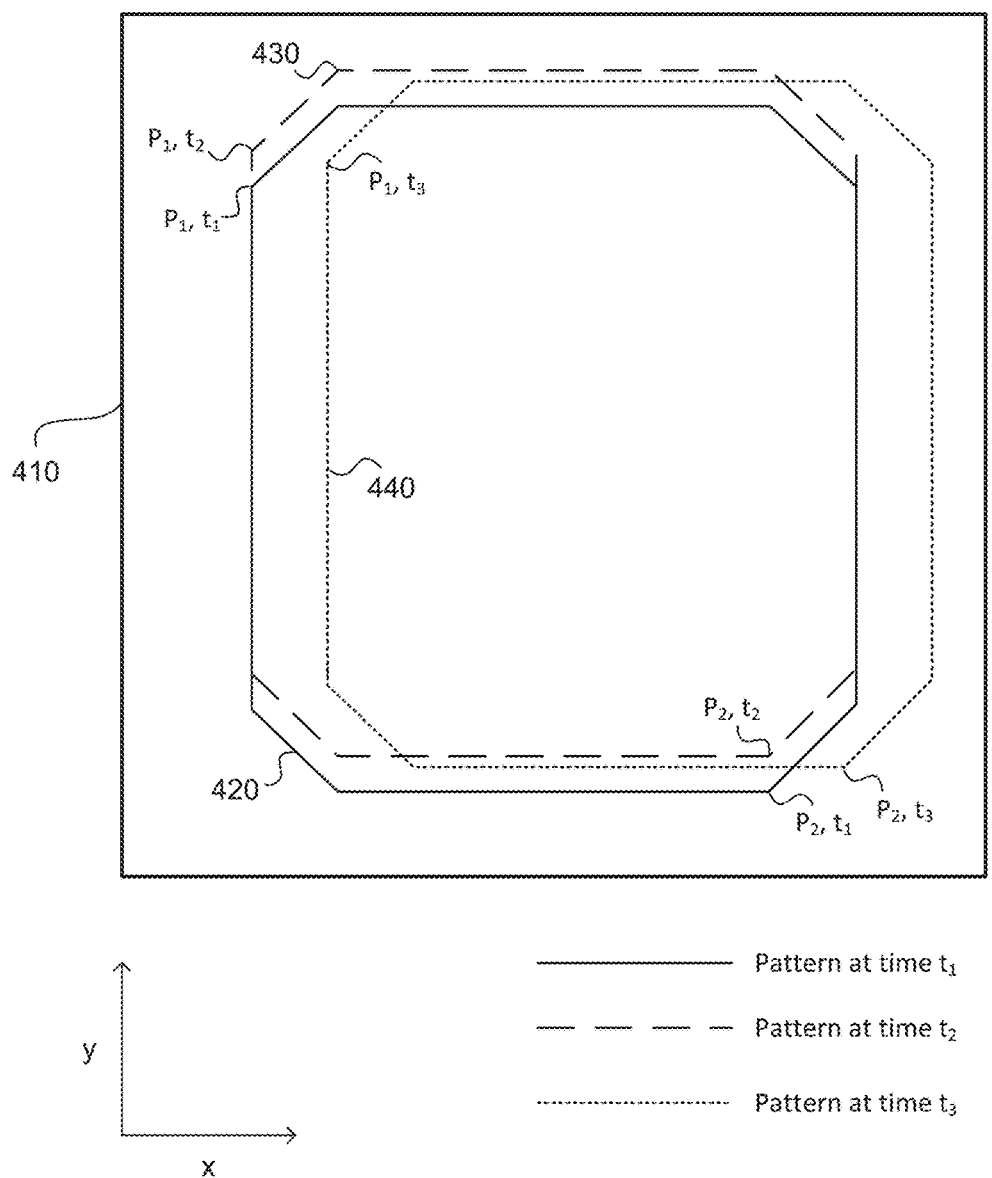
FIG. 4 includes exemplary representations of different image patterns to illustrate an image registration operation performed by the processing component of the device illustrated in FIG. 1, according to an exemplary embodiment of the present disclosure.

FIGS. 4 and 5 provide exemplary representations of image patterns to illustrate various exemplary embodiments of an image registration operation performed by the processing component of the device illustrated in FIG. 1. As described above, the optical sensing component 120 is configured to record the plurality of images of the interference pattern within an image frame (e.g., the image frame of the camera 120 in FIG. 3) at the plural points in time. FIG. 4 illustrates an image frame 410 which corresponds to the image frame of the camera 120 in FIG. 3. As illustrated in FIG. 4, the optical sensing component 120 has recorded three image patterns 420, 430, 440 at time $t_1$, time $t_2$ and time $t_3$, respectively, during a processing interval of observation. In FIG. 4, the processing component 130 has overlaid patterns 430 and 440 on pattern 420 for determining temporal changes between the patterns. For clarity of illustration, patterns 420, 430, 440 are shown to have the same shape in FIG. 4. It is to be understood that the present disclosure is not limited thereto. In the example of FIG. 4, the patterns 420, 430, 440 differ with respect to each other in their respective positioning within the image frame 410. For instance, point P1, $t_1$ of pattern 420 differs from point P1, $t_2$ of pattern 430, and differs from point P1, $t_3$ of pattern 440. Points P2, $t_1$, P2, $t_2$ and P2, $t_3$ of patterns 420, 430, 440, respectively, similarly differ as shown in FIG. 4. According to an exemplary embodiment, the processing component 130 is configured to determine temporal changes in the patterns 420, 430, 440 during the plural points in time $t_1$, $t_2$, $t_3$, for example, based on a respective intensity of the patterns within the image frame 410. The processing component 130 is configured to determine the temporal changes by determining the amount of displacement reflected in the overlapping patterns as illustrated in FIG. 4. For example, the processing component 130 can be configured to determine that the pattern 430 has moved a certain amount in the y direction relative to pattern 420. The processing component 130 can also be configured to determine that the pattern 440 has moved in the x and y directions relative to either or both of the patterns 420, 430, and thereby determine the temporal changes in the patterns 420, 430, 440.

The processing component 130 can be configured to determine the temporal changes in the patterns 420, 430, 440 according to a number of different techniques. For example, according to one technique, the processing component 130 can be configured to determine temporal changes between successive patterns that are recorded during the period of observation. For instance, with reference to the example of FIG. 4, the processing component 130 can be configured to determine temporal changes between the patterns 420 and 430 recorded at times $t_1$ and $t_2$, respectively, and determine temporal changes between the patterns 430 and 440 recorded at times $t_2$ and $t_3$, respectively. According to another technique, the processing component 130 can be configured to determine temporal changes in the patterns 420, 430, 440 based on amount of displacement between two or more patterns within the image frame. The displacement can be determined based on the intensities of the patterns and their relative motion with respect to each other. For example, in FIG. 4, the patterns 420, 430, 440 each have a greater intensity along the illustrated lines of their respective patterns, as compared to other segments within the image frame 410. The temporal changes in the patterns 420, 430, 440 can then be determined based on an amount of displacement between the overall patterns, for example, based on an amount of linear displacement relative to the x-y coordinates of the patterns, and/or based on amount of linear displacement of one or more segments (e.g., pixels) within the respective patterns. Accordingly, the determination of displacement between two or more patterns can be based on the entire patterns and/or individual segments of the respective patterns. For instance, in FIG. 4, the processing component 130 can be configured to determine temporal changes between the patterns 420 and 430 record at times $t_1$ and $t_2$, respectively, and determine temporal changes between the patterns 430 and 440 recorded at times $t_2$ and $t_3$, respectively. Alternatively or in addition, the processing component 130 can be configured to determine temporal changes between individual segments of the respective patterns to determine changes in position of the patterns at different points in time.

For example, in FIG. 4, the processing component 130 can be configured to determine an amount of displacement between individual segments within each respective pattern, such as the displacement of point P1, $t_1$ of pattern 420 with respect to point P1, $t_2$ of pattern 430 and point P1, $t_3$ of pattern 440. Similarly, the processing component 130 can be configured to determine the relative displacement between points P2, $t_1$, P2, $t_2$ and P2, $t_3$ of patterns 420, 430, 440. In FIG. 4, the above-described points are examples of segments of the images. The processing component 130 can also be configured to identify a plurality of segments based on pixels of the images, as described below with respect to FIG. 5.

FIG. 5 illustrates another exemplary embodiment of an image registration operation performed by the processing component 130. The processing component 130 can divide each pattern image into a plurality of segments, such as the pixels of the image. In the example of FIG. 5, each image consists of 64 pixels within 8 rows (x direction) and 8 columns (y direction). It is to be understood that FIG. 5 is a simplified example for the purpose of illustration. The images will have a substantially greater number of pixels than 64. At least one of the pattern images (identified as pattern 1, pattern 2, pattern 3 . . . pattern n in FIG. 5) will serve as the reference image. For example, the processing component 130 can designate pattern 1 as the reference image because it is the earliest image to have been recorded by the optical sensing component 130 in the sequence of images illustrated in FIG. 5. According to an exemplary embodiment, the reference image can be designated by an operator of the device, for example, by inputting a command in the operator interface processing unit 142. For example, the processing component 130 can be configured to instruct the display unit 140 to display a plurality of image patterns, and the operator can select the reference image from among the displayed image patterns. According to an exemplary embodiment, the processing component 130 can be configured to generate a reference image based on a number of pattern images generated over a portion of the observation period. For example, the processing component 130 can generate the reference image by recording the respective intensities of the patterns, as well as segments of the patterns, over a portion of the observation period to obtain operator-selectable values for the reference image, such as minimum/maximum threshold values for the pattern and/or segments of the pattern, average intensity values for the pattern and/or segments of the pattern, a selectable rate of change for the pattern and/or segments of the pattern, etc. Such values can also be predefined and recorded in the MEM 136 such that the values are preset and used by the processing component 130 to generate the reference image, until such preset values are modified by the operator.

For each pattern image, the processing component 130 can register each pixel by intensity-based techniques or feature-based techniques. Intensity-based techniques compare intensity patterns in images via correlation metrics, while feature-based methods find correspondence between image features such as points, lines, and contours. The example of FIG. 5 uses an intensity-based technique based on the intensity of each pixel. In the example of FIG. 5, each pixel is registered based on its x-y location and its intensity (e.g., dark or light). The processing component 130 can store the registration of each pixel, in association with an identification of the corresponding image, in the MEM 136 illustrated in FIG. 2. For example, the processing component 130 can register each pixel in association with its pattern image and pixel location, such as "image n(x,y)", where "n" refers to the image number, x refers to the horizontal location, and y refers to the vertical location of the corresponding pixel. The processing component 130 can then determine the temporal changes in the pattern image by comparing the plurality of images and calculating changes in position in the pattern by calculating changes in position of the corresponding identified segments in the plurality of images.

In the example of FIG. 5, the processing component 130 can determine, based on the image registrations stored in the MEM 136, that pixels 2(4,4), 2(5,4), 2(5,7) and 2(6,7) of image 2 differ with the corresponding pixels in image 1. Similarly, the processing component 130 can determine, based on the image registrations stored in the MEM 136, that pixels 3(1,8), 3(1,7), 3(5,2) and 3(5,3) differ with the corresponding pixels in image 2, and that pixels n(5,1), n(6,1), n(6,5), n(7,5), n(8,5) and n(8,6) differ with the corresponding pixels in image 3. In the example of FIG. 5, for clarity of illustration, a segment changing from a light intensity to a dark intensity with respect to the prior image is illustrated as a gray segment with vertical hashing, and a segment changing from a dark intensity to a light intensity with respect to the prior image is illustrated as a white segment with horizontal hashing. However, it is to be understood that the segments will change from light to dark intensity or from dark to light intensity in the example of FIG. 5 rather than change to an intensity with hashing. Accordingly, the processing component 130 is configured to associate each of the identified segments (e.g., pixels) with position information indicating a respective position (e.g., based on Cartesian coordinates) within the image frame in each corresponding image, and to determine whether the corresponding position information for at least one of the identified segments in one of a plurality of images (e.g., pattern 3) changes with respect to the corresponding position information for at least one of the identified segments in another one of the plurality of images (e.g., pattern 2).

In the foregoing example described with reference to FIG. 5, the processing component 130 is described as determining whether segments of an image change with respect to corresponding pixels in the preceding image recorded by the optical sensing component 120. The present disclosure is not limited thereto. The processing component 130 can determine whether segments of an image change with respect to corresponding segments in the reference image or any other pattern image recorded by the optical sensing component 120. For example, with reference to FIG. 4, the reference image can be defined and recorded (e.g., in the MEM 136) as at least one of the pattern images 420, 430, 440, and the processing component 130 can determine whether one or more of the recorded image patterns differs by a predetermined amount from the defined reference image. Further, the processing component 130 can be configured to determine whether the corresponding position information for at least one of the identified segments in a first one of the plurality of images (e.g., pattern 3 in FIG. 5) changes with respect to a predetermined number of the plurality of images (e.g., two images including pattern 1 and pattern 2 in FIG. 5).

Figure 6:
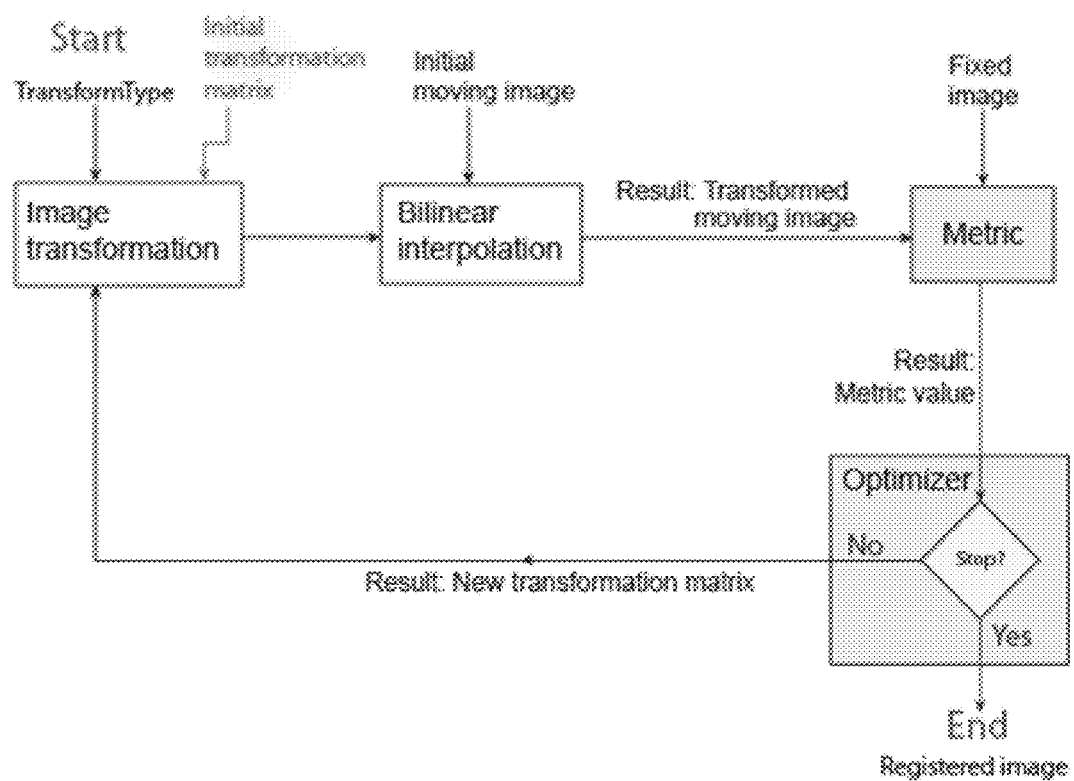
FIG. 6 is a diagram illustrating a process flow for performing image registration according to an exemplary embodiment of the present disclosure.

FIG. 6 is a diagram illustrating a process flow for performing intensity-based image registration according to an exemplary embodiment of the present disclosure. The process flow illustrated in FIG. 6 is known from MatLab®. Intensity-based automatic image registration is an iterative process. It requires that specifying a pair of images, a metric, an optimizer, and a transformation type. The metric defines the image similarity metric for evaluating the accuracy of the registration. This image similarity metric takes two images and returns a scalar value that describes how similar the images are. The optimizer defines the methodology for minimizing or maximizing the similarity metric. The transformation type defines the type of 2-D transformation that brings the misaligned image (called the moving image) into alignment with the reference image (called the fixed image). The process illustrated in FIG. 6 begins with the specification of a transform type and an internally determined transformation matrix. Together, they determine the specific image transformation that is applied to the moving image with bilinear interpolation. Next, the metric compares the transformed moving image to the fixed image and a metric value is computed. Finally, the optimizer checks for a stop condition. A stop condition is anything that warrants the termination of the process. In most cases, the process has reached a point of diminishing returns or it has reached the specified maximum number of iterations. If there is no stop condition, the optimizer adjusts the transformation matrix to begin the next iteration.

In accordance with the image registration process illustrated in FIG. 6, an exemplary embodiment of the present disclosure registers pattern images using translations in x and y coordinates (i.e., two-dimensional Cartesian coordinates). Given a reference image, $I_0(x)$ (where x is the 2D coordinate $\{x_i, y_i\}$), the task is to find the offset, x+u (where u is the displacement vector) such that it aligns with another image $I_1(x)$. In order to achieve sub-pixel resolution, a linear interpolation is used based on the intensity between neighboring pixels, such that an offset can be quantified that can be smaller than a single pixel in each dimension. Each time the reference image is translated, an error metric is calculated. A suitable error metric for this embodiment is to use the normalized cross-correlation (NCC) metric, which can be defined as:

$$NCC = \frac{\sum_i [I_0(x_i) - \langle I_0 \rangle][I_1(x_i + u) - \langle I_1 \rangle]}{\sqrt{\sum_i [I_0(x_i) - \langle I_0 \rangle]^2 [I_1(x_i + u) - \langle I_1 \rangle]^2}}$$

Where <I> denotes, for example, an average intensity of all pixels in the image being registered. Thus, according to an exemplary embodiment, <I>=(1/N)×(the sum of the intensities of all N pixels in the image being registered). As described, for example, in R. Szeliski, "Image Alignment and Stitching: A Tutorial," Foundations and Trends in Computer Graphics and Vision, vol. 2, no. 1, 1-104 (2006), the entire disclosure of which is hereby incorporated by reference in its entirety, a search algorithm is employed to find the maximum of this function for a range of displacements u for each pixel coordinate $x_i$. The u that maximizes this function is determined. This process is repeated for each image in the temporal sequence (relative to either a single reference image, or to the image temporally adjacent) to generate a temporal waveform for each pixel coordinate vs time (x and y coordinates).

In accordance with an exemplary embodiment, the processing component 130 is configured to, based on the image registrations stored in the MEM 136, calculate a frequency of change for each of the recorded images (e.g., images 420, 430 or 440 in FIG. 4), as well as a frequency of change of each of the corresponding identified segments in the plurality of images (e.g., the illustrated lines in FIG. 4 representing a darker intensity for each corresponding image 420, 430, 440, and/or the individual points P, t, or the individual segments illustrated in FIG. 5). The processing component 130 can therefore determine if detected motion for the identified segments has a certain amount of frequency content in a specific frequency band (e.g., between 1 Hz to 10 Hz). Motion represented in a particular frequency band can have a particular energy level associated with each frequency band, respectively. The processing component 130 determines, within the plural points in time at which the optical sensing component 120 records the images, whether detected motion has a certain amount of energy in a certain range of frequencies (e.g., a human heartbeat at approximately 1 Hz). Further, the processing component 130 can be configured to detect non-visible contents of the object 160 by determining which of the corresponding identified segments in the plurality of images have at least a predetermined rate of change within the plural points in time during which the optical processing component 120 records the pattern images. Further, the processing component 130 is configured to detect a frequency of vibration in at least one non-visible content based on the determined rate of change of corresponding segments in the image frame within the plural points in time.

As discussed above with respect to FIGS. 4 and 5, the processing component 130 is configured to determine motion of the non-visible contents of the object 160 in a first direction (e.g., horizontal direction) and in a second direction (e.g., vertical direction) transverse to the first direction. It is to be understood that the first and second directions do not have to be perpendicular to each other. For example, the second direction can be offset from the first direction by a predetermined angle (e.g., 45 degrees).

Exemplary embodiments of the present disclosure were described above with respect to frequency qualifications. However, the present disclosure is not limited thereto. The processing component 130 can configured to determine temporal changes in the pattern of the light 150 received by the optical sensing component 120 based on the recognition of different patterns, time domain differences, cross-correlation between different light signals received from the object 160, etc. For instance, according to an exemplary embodiment of the present disclosure, the processing component 130 can determine a center of mass of the pattern for each image frame in a sequence. Other techniques include optical flow pattern recognition using any one of the known Lucas-Kanade method, the known Horn-Schunk method, or the known Black-Jepson method.

Figure 7:
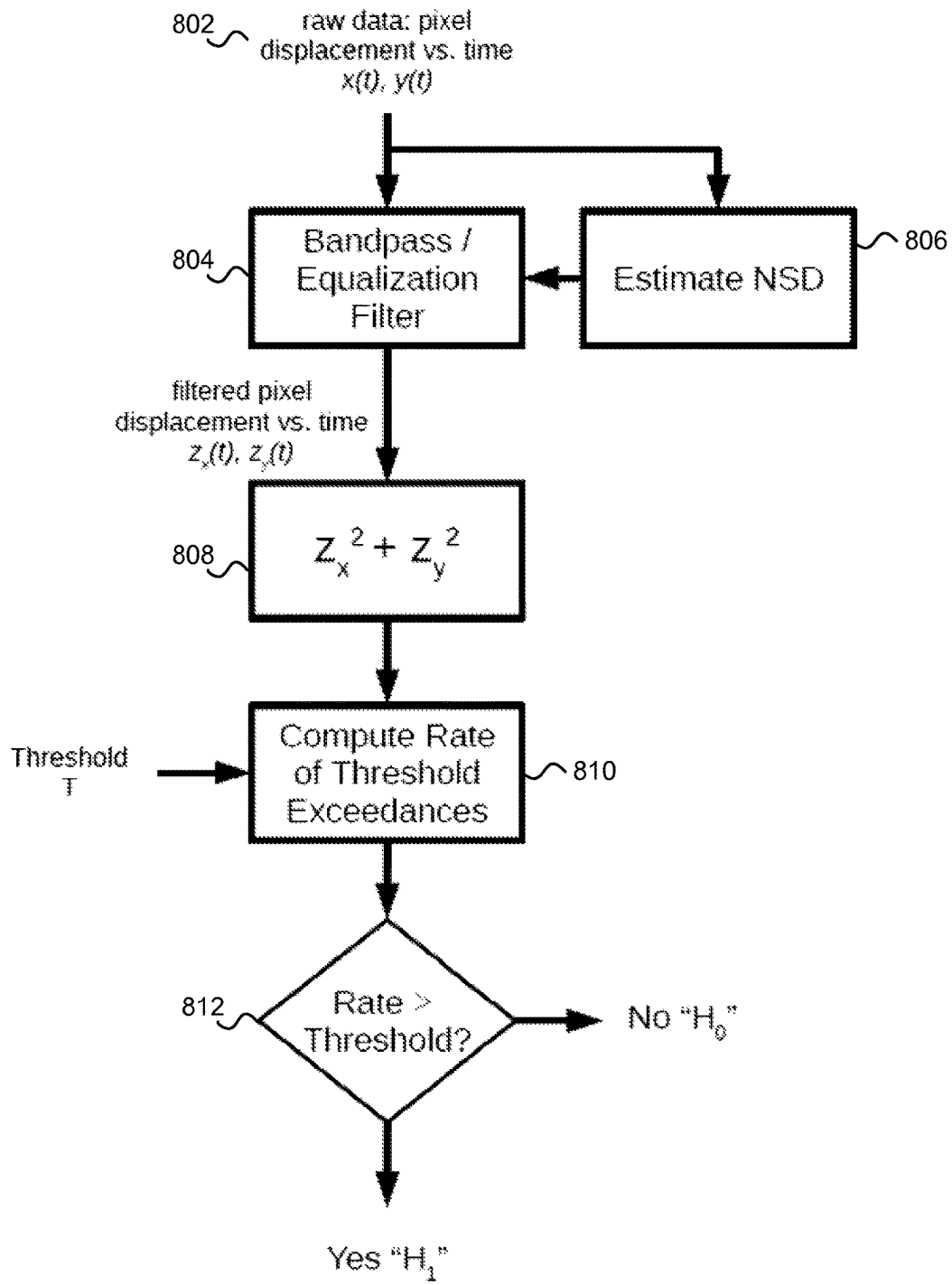
FIG. 7 is a flowchart diagram illustrating a process of detecting non-visible content of an object in a non-contact manner, according to an exemplary embodiment of the present disclosure.

FIG. 7 is a flowchart diagram illustrating a process of detecting non-visible content of an object in a non-contact manner, according to an exemplary embodiment of the present disclosure. The processing component 130 is configured to execute the process illustrated in FIG. 7. The process of FIG. 7 begins at step 702 which occurs after image registration. The image registration process as discussed above provides an offset x(t), y(t) as a function of time t (e.g., pixel displacement versus time). In step 704, the offset data, which is in the time domain, is converted to the frequency domain, for example, by applying a fast Fourier transform (FFT) algorithm. Optionally, in step 704, a bandpass filter can be applied to filter out some frequencies so that only a predetermined range of frequencies is passed through. As will be described in more detail below, vehicle suspensions are known or observed to have a vibration frequency of 2-8 Hz, for example. As a result, a bandpass filter may be applied in step 704 so that only frequencies within the range of 2-8 Hz, for example, are passed through. It is to be understood that this frequency range is an example relating to the suspension dynamics of vehicles, and other frequency ranges can be used depending on the object under investigation. As an additional optional feature, step 706 provides for noise cancellation utilizing an estimation of noise spectral density (NSD). Certain noise characteristics can be present in all measured signals, so the purpose of step 706 is to remove that consistent noise (e.g., by subtraction). 1/f, where f is the frequency, is one example of NSD. The present disclosure utilizes known noise cancellation techniques, so further explanation on step 706 is believed to be unnecessary. Step 708 processes the output of the filtered pixel displacement, for example, the output of the FFT algorithm. The function performed in step 708 is to compute the square of the pixel displacement ($Z_x^2 + Z_y^2$) as a function of time. The function of step 710 is to compute the rate at which the square of the pixel displacement ($Z_x^2 + Z_y^2$) exceeds a threshold value. In accordance with an exemplary embodiment, the threshold value can define the upper and/or lower limits of the amount and/or rate of temporal changes in the pattern images. The threshold can be defined by the operator and recorded in the MEM 136, for example. Comparing the rate of the change with a definable threshold can allow for the determination of a frequency of change between successive images and/or a rate of change with respect to a reference image. In addition, comparing the rate of change with a definable threshold can allow for the determination of certain types of movement in the object. For instance, if one or more human beings are within a container and one of the human beings stands up, or makes some other type of sudden movement, that amount of significant movement can be determined by setting the threshold value to focus on such sudden movements. In step 712, the determined rate of change is compared with the threshold value to determine whether the determined rate of change exceeds (or is less than) the threshold value, in which case the processing component 130 can output a signal to the display 140 indicating that a sudden movement has been detected. FIG. 7 illustrates an example of the algorithm utilized by the processing component 130 for determining temporal changes in the pattern images and detecting motion therefrom. It is to be understood that the present disclosure can be implemented using different algorithms than that illustrated in FIG. 7. For example, the present disclosure can utilize cross-correlation analysis or other forms of signal decomposition or pattern matching.

In accordance with the above-described exemplary embodiments, the processing component 130 is configured to determine temporal changes in the pattern received by the optical sensing component 120 during the plural points in time in which the received pattern of light 150 is recorded, and to detect whether motion is present in the object 160 based on determined temporal changes in the pattern. In accordance with an exemplary embodiment, the motion that is detected by the processing component 130 represents a frequency source of non-visible content in the object 160. As described above, the term "frequency source" means an object which experiences or produces an event (e.g., heartbeat) that has a temporal frequency or cycle. For example, the processing component 130 can detect periodic motion such as the heartbeat of a human being located in the object 160 based on temporal changes in the pattern of light 150 representing the surface properties of the object 160. In accordance with the above-described exemplary embodiments, the processing component 130 can thus detect the presence of one or more non-visible humans in an object 160 such as a vehicle or shipping container. The processing component 130 can, based on detected motion, determine where a particular human is within the object based on the determination of displacement of images within the pattern of light 150 received from the object. An example of detecting the particular location of a human in an object is described in more detail below with respect to FIG. 8.

Figure 8:
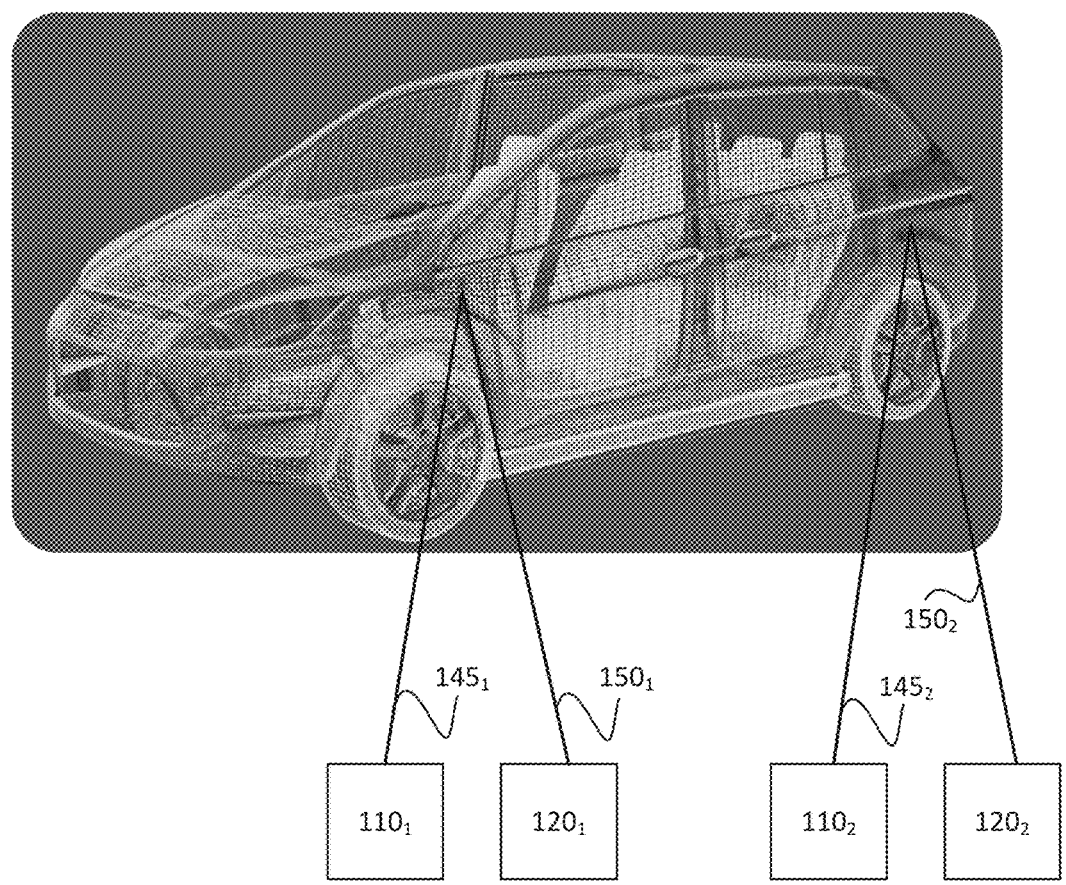
FIG. 8 is an illustration of an exemplary embodiment of the present disclosure utilizing two light sources on different surfaces of an object to be inspected in determining whether motion is present in the object.

FIG. 8 is an illustration of an exemplary embodiment of the present disclosure utilizing two or more light sources on different surfaces of an object to be inspected in determining whether motion is present in the object. In the example of FIG. 8, a first light source 110$_1$ is configured to emit a first light 145$_1$ toward a first surface of the object (e.g., the front portion of a vehicle), and a second light source 110$_2$ is configured to emit a second light 145$_2$ toward a second surface of the object (e.g., the rear portion of the vehicle). As is apparent from the example of FIG. 8, the first and second surfaces of the object are different from each other (e.g., separated by a predetermined distance). It will be appreciated that the first and second surfaces do not have to be on the same side of an object. For example, the first surface of an object can be the front license plate of the vehicle, and the second surface of the object can be the rear license plate of the vehicle.

In the example of FIG. 8, for clarity of illustration, a first optical sensing component 120$_1$ is provided to receive a first pattern of light 150$_1$ from the first surface of the object (e.g., reflected from the first surface), and a second optical sensing component 120$_2$ is provided to receive a second pattern of light 150$_2$ from the second surface of the object (e.g., reflected from the second surface). However, it is to be understood that the present disclosure is not restricted thereto. The same optical sensing component can be used for multiple light sources.

In the example of FIG. 8, the first optical sensing component 120$_1$ receives the first pattern of light 150$_1$ from the first surface of the object, and the second optical sensing component 120$_2$ receives the second pattern of light 150$_2$ from the second surface of the object. The processing component 130, in turn, records a first image of the interference pattern 150$_1$ of light received from the first surface of the object, and records a second image of the interference pattern of light 150$_2$ received from the second surface of the object. Further, in accordance with the above-described exemplary embodiments, the processing component 130 records a plurality of the first images over the plural points in time in which the object is observed, and records a plurality of the second images over the plural points in time in which the object is observed.

Utilizing the plurality of first and second images which were recorded based on the interference patterns received from different surfaces of the object, the processing component 130 is configured to compare the plurality of first and second images to determine the amount of displacement observed in the first images during the plural points in time in relation to the amount of displacement (i.e., temporal changes) observed in the second images during the plural points in time. For example, if the processing component 130 determines that the amount of displacement is greater in the first images than the amount of displacement in the second images, then the processing component 130 can determine that there is a greater amount of motion in the portion of the object from which the first images were obtained than the amount of motion in the portion of the object from which the second images were obtained. Accordingly, in the example of FIG. 8, if the processing component 130 determines that the amount of displacement in the first images obtained from the pattern of light 150$_1$ received from the front portion of the vehicle is greater than the amount of displacement in the second images obtained from the pattern of light 150$_2$ received from the second portion of the vehicle, the processing component 130 can determine that it is more likely that non-visible content (e.g., a person) is present near the first portion of the vehicle rather than the second portion of the car, since there is a greater amount of detected motion in the first portion of the car based on the relative amount of displacements between the first and second images.

In the example of FIG. 8, in accordance with the above-described exemplary embodiments, the processing component 130 is configured to identify a plurality of segments (see, e.g., FIGS. 4 and 5) in each of the first and second images of the first and second interference patterns, respectively, and identify segments in the first images which respectively correspond to segments in the second images. The processing component 130 is also configured to detect temporal changes in the first and second interference patterns by calculating changes in position in the corresponding segments of the plurality of first and second images during the plural points in time. Furthermore, the processing component 130 can record position information for each segment identified in each of the first and second images, respectively, calculate changes in position of the corresponding segments by determining whether position information of the corresponding segments of the plurality of first and second images changes during the plural points in time, and detect whether motion is present in the object based on the calculated changes in position of the corresponding segments of the plurality of first and second images.

Regarding the above-described example in which the processing component 130 can detect periodic motion such as the heartbeat of a human being located in an object 160, an exemplary embodiment of the present disclosure can perform such detection by focusing on a particular frequency of motion, or a range of frequencies of motion. For instance, according to an exemplary embodiment, the processing component 130 can utilize band-pass filters to remove any periodic motion of an interference pattern that is outside a predetermined frequency range. Periodic motion of an object based on human heartbeats (e.g., 60-100 beats per minute) can therefore be isolated by removing periodic motion of an interference pattern that falls outside a predetermined frequency range. An energy detector can then be applied to the processing results after filtering, where the energy detector can define a certain threshold level of motion.

This technique of focusing on a particular frequency range can be used similarly to detect motion of the object based on other known or observed frequencies such as the respiratory rate of a human being (0.25 Hz to 0.33 Hz), the standing sway rate of a human being (0.5 to 1 Hz), vibrations caused by the operation of machinery, etc. The frequency of vibration caused by the operation of machinery can be measured with respect to the machinery being operated (e.g., vibrations from a vehicle engine) or another object within the vicinity of the machinery. For example, the frequency of vibration can be related to vibrations in underground tunneling equipment due to motion in the tunnels and/or motion near the tunnels (e.g., in the ground above the tunnels), vibrations in a structural component due to motion in the vicinity of the structural component (e.g., a vehicle travelling near a telephone pole and causing vibrations in the telephone pole as the vehicle approaches and travels past the telephone pole). The frequency of vibrations caused by the operation of machinery may depend on attributes of the machinery involved. For example, the frequency of vibration relating to the shocks of a passenger sedan may be different from the frequency of vibration relating to the shocks for a semi-trailer truck. Generally, the frequency of vibration of shocks in larger vehicles is less than the frequency of vibration of shocks in smaller vehicles. Similarly, the frequency of vibrations in a structural component proximate to a travelling vehicle may be different based on attributes of the vehicle travelling proximate to the structural component, such as the weight and speed of the vehicle, the distance of the structural object to the vehicle, etc., as well as attributes of the structural component and/or environmental conditions of the structural component, such as the material composition of the structural component, the substance in which the structural component is at least partially contained (e.g., buried), etc. The above-described attributes of the machinery and/or the structural component can be observed over a period of time and recorded in the MEM 136, for example, to establish a baseline or reference frequency range. The processing component 130 can use the established baseline or reference frequency range as a factor in determining whether motion of an object under observation is present.

Figure 9A:
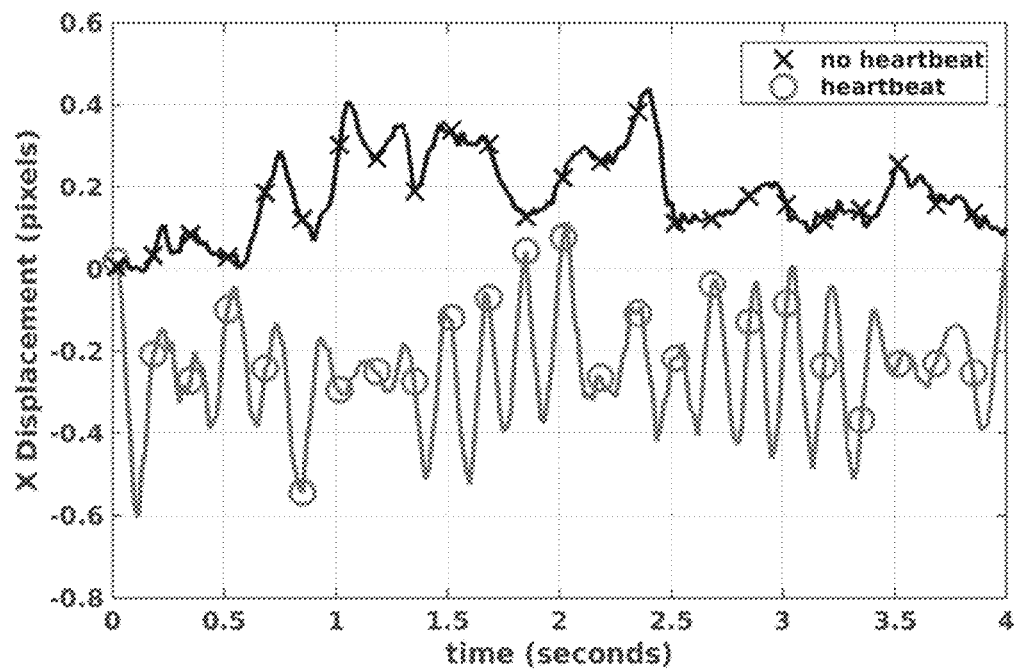
FIGS. 9A-9B illustrate graphical results of detecting human presence in a vehicle according to an exemplary embodiment of the present disclosure.
Figure 9B:
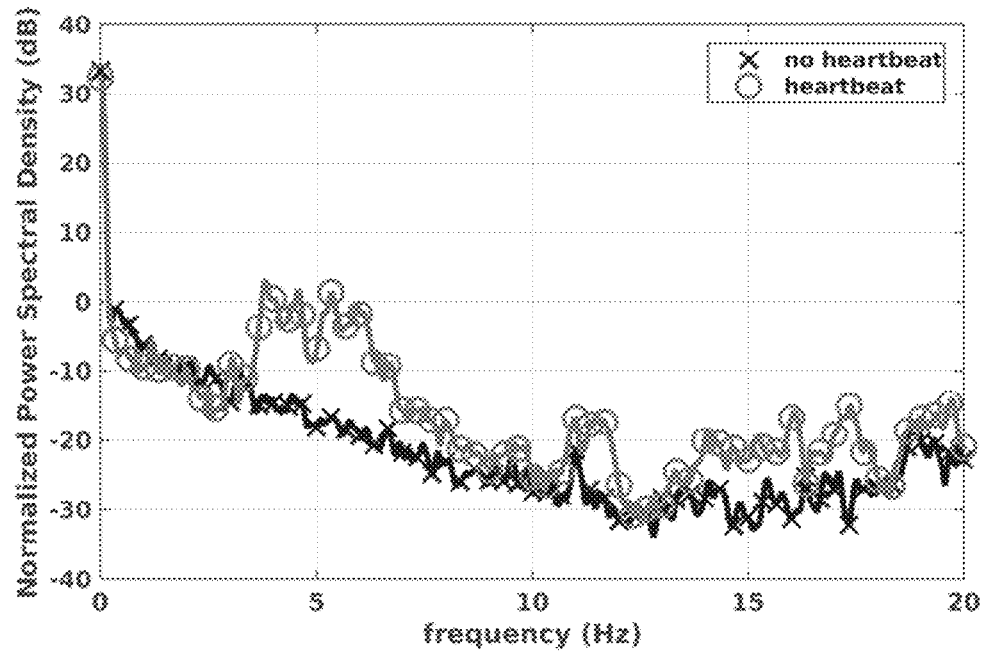

FIGS. 9A and 9B are graphs illustrating the output of the processing component 130 detecting temporal changes in the pattern of light received from the surface of a vehicle. FIG. 9A is a graph illustrating displacement as a function of time as measured by processing component 130 for examples where a heartbeat is not present and where a heartbeat is present. FIG. 9B is a graph illustrating the power spectral densities of the displacement time series for examples where a heartbeat is not present and where a heartbeat is present. In the examples of FIGS. 9A and 9B, the inputs to the detection process are time series data of x- and y-displacement from interference pattern images. The data are filtered using a band-pass equalization filter where characteristics of the equalization filter are derived from the power spectral density (PSD) of the input data. In the examples of FIGS. 9A and 9B, the frequency limits of the bandpass filter are chosen based on the expected frequencies of the heartbeat waveform. The equalization filter is designed so that the expected power spectral density of the noise at the output of the filter is 0 dB across the frequency band. The magnitude-squared of the band-pass equalization filter time-series output is compared with a detection threshold. A determination of motion present in the object is based on the rate of detection exceeding a threshold value. According to an exemplary embodiment, the processing component 130 can apply a fast Fourier transform (FFT) algorithm to detected motion in the vehicle to isolate particular motion.

Figure 10A:
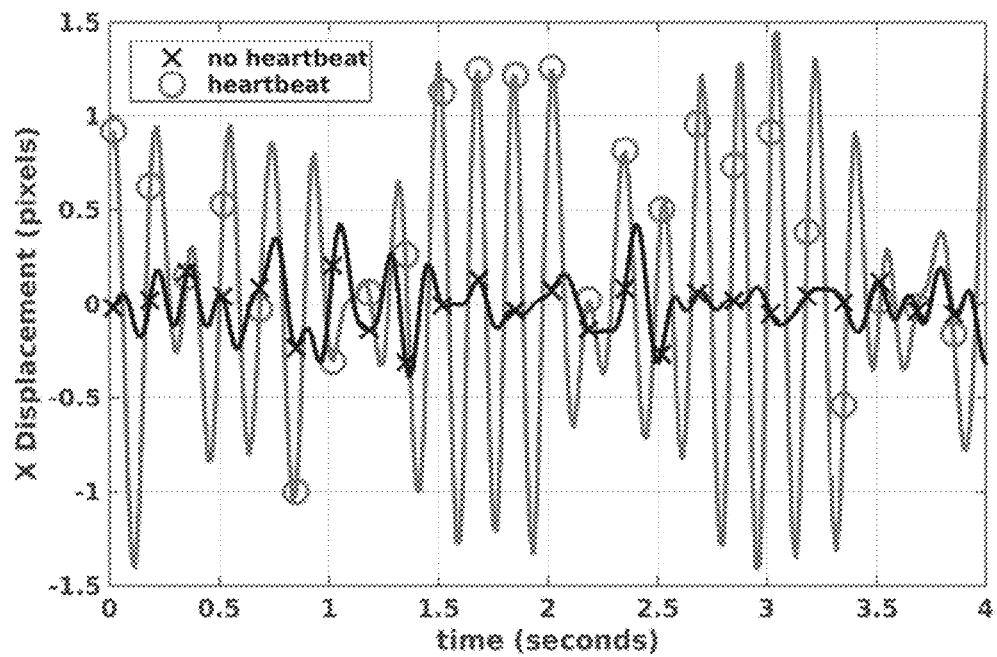
FIGS. 10A-10C illustrate graphical results of detecting human presence in a vehicle according to an exemplary embodiment of the present disclosure.
Figure 10B:
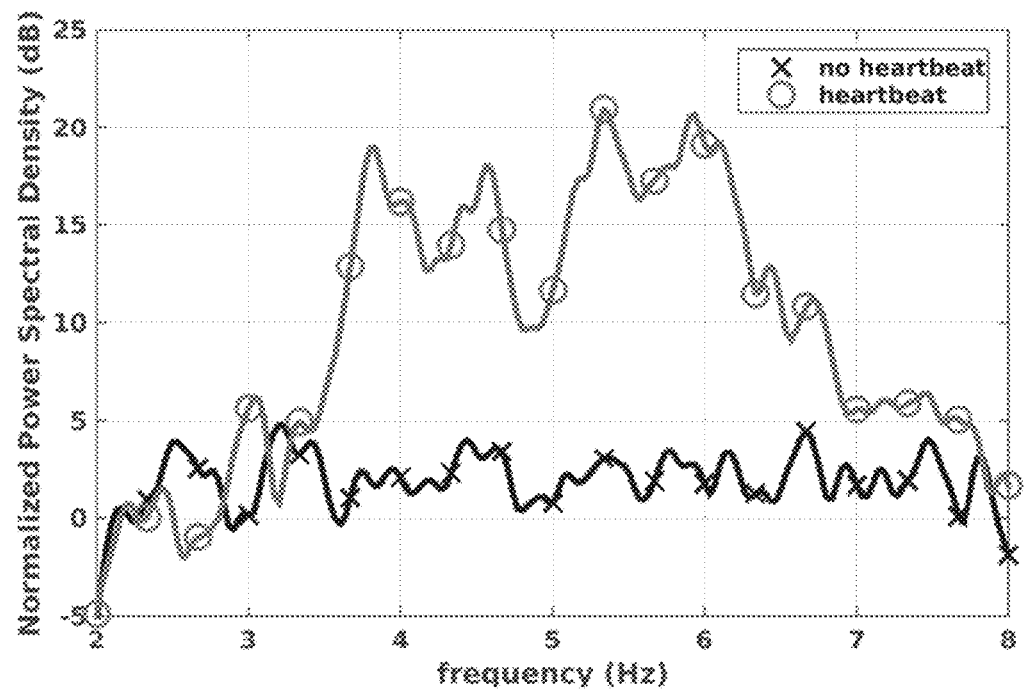
Figure 10C:
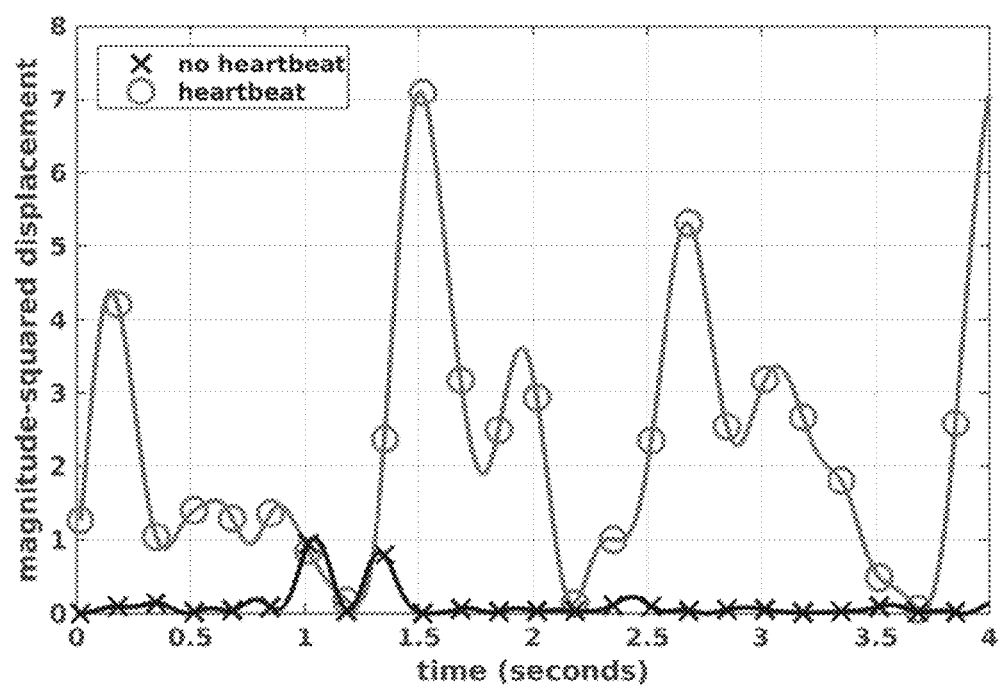

FIG. 10A is a graph illustrating examples of time-series output of the band-pass equalization filter. FIG. 10B is a graph illustrating examples of the PSD for the output of the band-pass equalization filter across a frequency band from 2 to 8 Hz. FIG. 10C is a graph illustrating examples of the magnitude-squared of the band-pass equalization filter output as a function of time.

Figure 11:
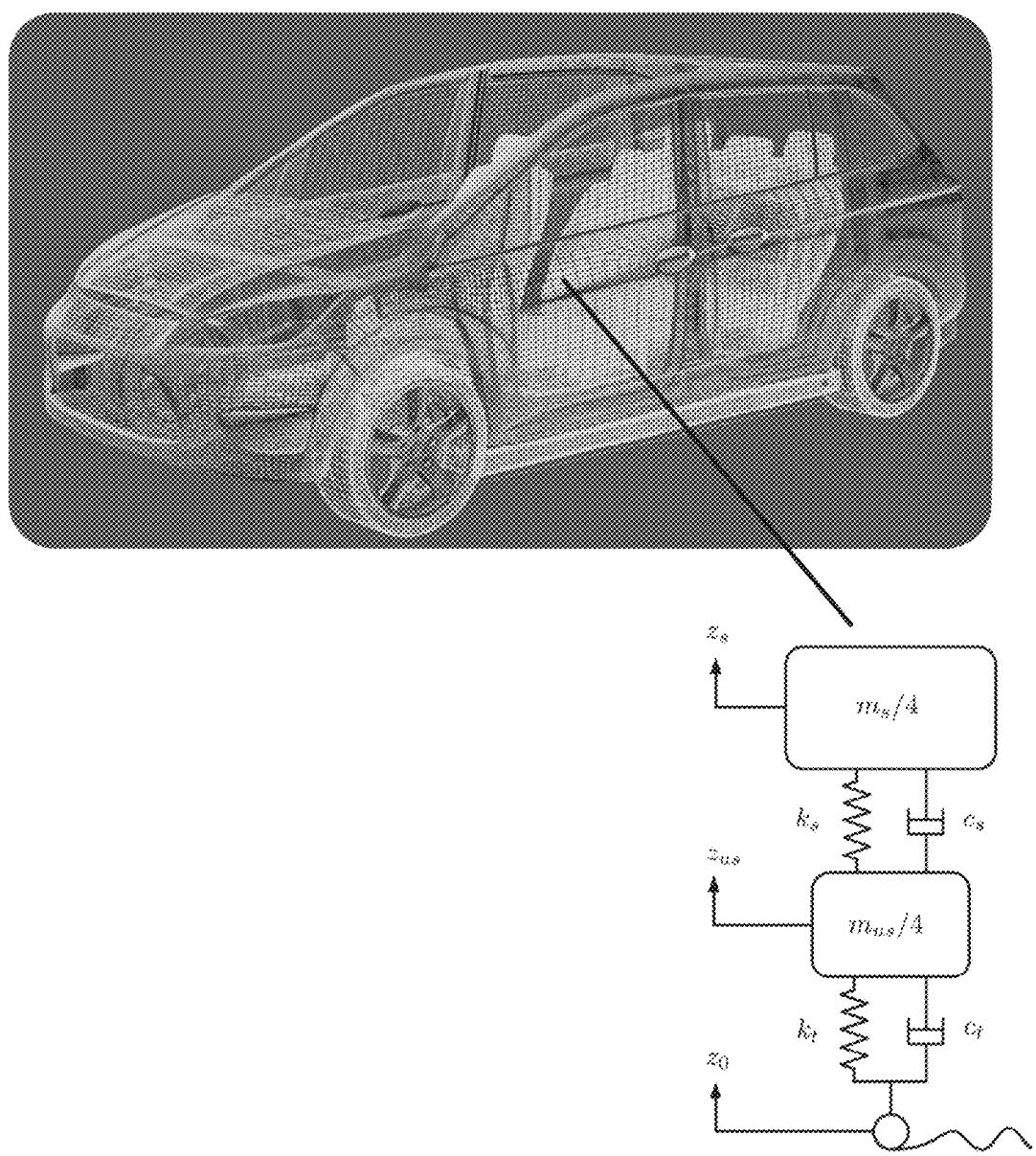
FIG. 11 is an illustration of how the suspension dynamics of the vehicle may affect motion characteristics.

The processing component 130 of the device can thus detect certain oscillations of the vehicle body that are only present when one or more living humans are located inside of the vehicle. Different vehicle models exhibit different human presence motion characteristics, for example, due to the suspension dynamics of the vehicle. FIG. 11 is an illustration of how the suspension dynamics of the vehicle may affect motion characteristics. The device of the present disclosure can detect an impulse created by the human heartbeat that excites the vehicle's body-suspension-tire dynamical system. In the example of FIG. 11, the observed motion is divided by 4 to account for the suspension system of the vehicle. In particular, the suspension dynamics of the vehicle cause the motion to be detected at about 4 Hz, whereas in the case of a human heartbeat, the frequency source to be detected (i.e., the existence of a heartbeat) is about 1 Hz. Thus, in the example of FIG. 11, the detected motion is divided by 4 to account for the suspension dynamics of the vehicle. It is to be understood that the identified division value of 4 is an example based on the observed suspension dynamics of the vehicle in the exemplary embodiment of FIG. 11. As discussed above, the frequency of vibrations caused by the operation of machinery may depend on attributes of the machinery involved. Thus, while the detected motion is divided by 4 to account for the suspension dynamics of the vehicle illustrated in FIG. 11, another divisional value may be used for other machinery (e.g., vehicles) depending on the attributes of such machinery.

Figure 12:
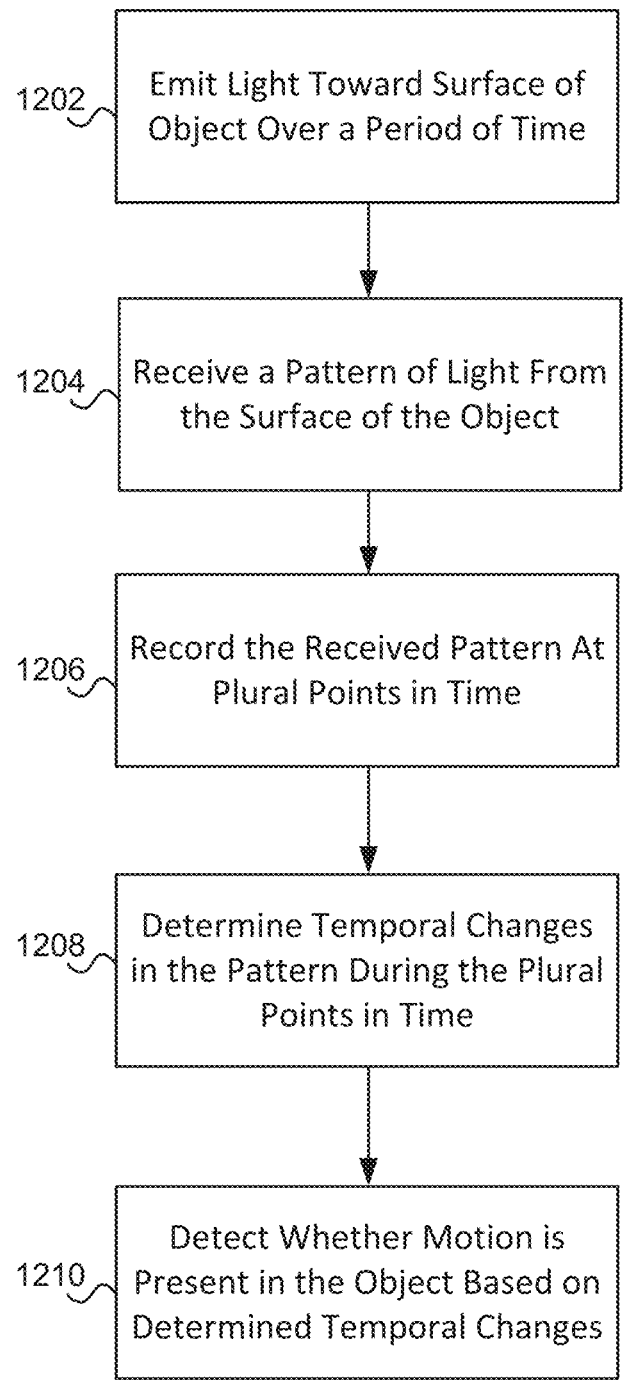
FIG. 12 is a flowchart illustrating steps of a method for detecting non-visible content of an object in a non-contact manner, according to an exemplary embodiment of the present disclosure.

The present disclosure also provides a method for detecting non-visible content of an object in a non-contact manner. The exemplary method of the present disclosure performs the features of the above-described exemplary embodiments. FIG. 12 is a flowchart illustrating steps according to an exemplary embodiment of the method. The exemplary method includes emitting light from a light source toward a surface of an object over a period of time (step S1202). The exemplary method also includes receiving, by an optical sensing component (e.g., optical sensing component 120), a pattern of light from the surface of the object (step S1204), and recording the received pattern at plural points in time (step S1206). In addition, the exemplary method includes determining, by a processor of a computer processing device (e.g., processing component 130 of device 100), temporal changes in the pattern during the plural points in time (step S1208), and detecting, by the processor, whether motion is present in the object based on determined temporal changes in the pattern, where the motion represents a frequency source of non-visible content in the object (step 1210).

The present disclosure also provides a non-transitory computer-readable recording medium (e.g., MEM in FIG. 2) having a computer program tangibly recorded thereon that, when executed by a processor of a computer processing device (e.g., processing component 130 of device 100), causes the processor to carry out operations for detecting non-visible content of an object in a non-contact manner. With reference to FIG. 12, the exemplary operations include emitting light from a light source toward a surface of an object over a period of time (step S1202). The exemplary operations also include receiving, by an optical sensing component (e.g., optical sensing component 120), a pattern of light from the surface of the object (step S1204), and recording the received pattern at plural points in time (step S1206). In addition, the exemplary operations include determining, by a processor of a computer processing device (e.g., processing component 130 of device 100), temporal changes in the pattern during the plural points in time (step S1208), and detecting, by the processor, whether motion is present in the object based on determined temporal changes in the pattern, where the motion represents a frequency source of non-visible content in the object (step 1210).

In exemplary embodiments described above, the processing component 130 is described as being configured to determine temporal changes in the pattern received by the optical sensing component 120 during the plural points in time in which the received pattern of light 150 is recorded, and to detect whether motion is present in the object 160 based on determined temporal changes in the pattern, where the motion that is detected by the processing component 130 represents a frequency source of non-visible content in the object 160. The present disclosure is not limited to detecting motion that represents a frequency source of non-visible content in the object 160. Alternatively or in addition, the processing component 130 is configured to determine the presence or absence of motion in the object 160 by determining whether the amount of temporal changes in the pattern images over the observation period differs by a predetermined amount with respect to a reference pattern image. The predetermined amount can be specified to be a threshold value, for example, that represents a baseline value of known activity (including the absence of activity) in the object, and when the temporal changes are determined to differ from the threshold value by a predetermined amount (above or below the threshold value), the processing component 130 is configured to detect that motion is present in the object 160 based on the determined pattern of temporal changes, where the motion represents non-visible content in the object. For example, as described above with reference to FIG. 7, the processing component 130 can compare a determined rate of change in the pattern images with a definable threshold to determine the frequency of change between successive images and/or a rate of change with respect to a reference image. In addition, comparing the rate of change with a definable threshold can allow for the determination of certain types of movement in the object. For instance, if one or more human beings are within a container and one of the human beings stands up, or makes some other type of sudden movement, that amount of significant movement can be determined by setting the threshold value to focus on such sudden movements (see, e.g., FIG. 10C). Alternatively, the threshold value can be set based on motion that is supposed to occur regularly, and the absence of motion is of importance. For example, if the frequency of vibration caused by a fluid such as water flowing through pipes is determined, the absence or diminution in such flow will decrease the frequency of vibration in the pipe, which can be detected by the device of the present disclosure. The present disclosure is not limited to determining the presence of motion based on thresholds. For example, the processing component 130 can define a reference pattern image, and the processing component 130 can detect whether any pattern image during the observation period, or predetermined number of pattern images, deviate from the reference image by a defined amount, and then determine that the motion is present in the object based on the determined deviation.

The present disclosure is not limited to using threshold values for the processing component 130 to determine whether the temporal changes differ a predetermined amount from the reference image. For instance, the device and method of the present disclosure can use the amplitude of a metric derived from a calculation that uses the displacement waveform. Such a metric could be, for example, a certain pattern of interest, or certain patterns to ignore. The metric can also calculate the correlation between a template pattern and the observed pattern, or, the goodness of fit between a template pattern and observed pattern using a metric such as chi-squared (sum of the squares of deviations). The metric can correspond to the mathematical calculations performed to register images that use a metric which tells the operator how aligned one frame is with a reference frame, except that the metric would be using a pattern on a section of the temporal waveform of pixel displacement versus time. For example, the metric can be similar to how one might fit time points to a sine curve, a Gaussian curve, or a damped sinusoid, for which parameters of the template curve are varied (e.g., the phase, amplitude and frequency) until the best fit is obtained. The metric used for goodness of fit (or alternatively, a correlation function, i.e., a degree of similarity) could also be something used to indicate the likelihood of a disturbance of interest.

The above-described exemplary embodiment in which the processing component 130 detects whether motion is present in the object when determined temporal changes in the pattern differ a predetermined amount from the reference pattern, where the motion representing non-visible content in the object, is an alternative to detecting motion represented by a frequency source. This alternative embodiment encompasses all the features of the present disclosure as described herein.

As noted above, the optical sensing component 120 can be a camera (e.g., a CCD or CMOS camera), a velocity and/or displacement sensor (e.g., a laser Doppler vibrometer), including a lateral displacement sensor, photodiodes, photomultiplier tubes, as well as other sensors that can detect light incident thereon. A sensor such as a laser Doppler vibrometer can utilize a plurality of sensors that have defined positions (e.g., one or more interferometers), whereby the intensity patterns on a given detector are modulated as a function of time due to changes in the optical length as a function of time. The principles of the present disclosure are equally applicable to such a sensor based on interferometry, except that the image registration process can be bypassed and processing of the temporal waveforms can be applied directly. Data sets from a laser Doppler vibrometer are sometimes similar to those obtained by laser speckle displacement (as described above, for example), yet contain different geometric information of the object motion (e.g., motion along the optical axis, as opposed to surface tilt into and out of a plane orthogonal to the optical axis). See, e.g., J. C. Dainty, "The Statistics of Speckle Patterns," Edited by E. Wolf, Progress in Optics XIV (1976), and B. Rose et al., "Laser-Speckle Angular-Displacement Sensor: Theoretical and Experimental Study," Applied Optics, v. 37, n. 11, pp. 2119-2129 (1998).

While the present disclosure has been illustrated and described in detail in the drawings and foregoing description, such illustration and description are to be considered illustrative or exemplary and not restrictive; the present disclosure is not limited to the disclosed embodiments. Other variations to the disclosed embodiments can be understood and effected by those skilled in the art and practicing the claimed invention, from a study of the drawings, the present disclosure, and the appended claims. In the claims, the word "comprising" or "including" does not exclude other elements or steps, and the indefinite article "a" or "an" does not exclude a plurality. A single processor or controller or other unit may fulfill the functions of several items recited in the claims. The mere fact that certain measures are recited in mutually different dependent claims does not indicate that a combination of these measures cannot be used to advantage.

It will be appreciated by those skilled in the art that the present disclosure can be embodied in other specific forms without departing from the spirit or essential characteristics thereof. The presently disclosed embodiments are therefore considered in all respects to be illustrative and not restricted. The scope of the disclosure is indicated by the appended claims rather than the foregoing description and all changes that come within the meaning and range and equivalence thereof are intended to be embraced therein.

What is claimed is:

1. A device for detecting non-visible content of an object in a non-contact manner, the device comprising:
a light source configured to emit light toward a surface of an object over a period of time, wherein the light source includes a first laser configured to emit a first laser light toward a first surface of the object, and a second laser light source configured to emit a second laser light at a second surface of the object;

an optical sensing component configured to receive a pattern of light from the surface of the object, and to record the received pattern of light at plural points in time, wherein the received pattern of light includes a first interference pattern received from the first surface of the object based on the first laser light, and a second interference pattern received from the second surface of the object based on the second laser light; and a processing component configured to determine temporal changes in the pattern of light during the plural points in time, and to detect whether motion is present in the object based on determined temporal changes in the pattern of light, the motion representing a frequency source of non-visible content in the object, wherein the optical sensing component is configured to record a plurality of images of the received pattern at the plural points in time, and the processing component is configured to calculate motion of corresponding identified segments in the plurality of images by determining which of the identified segments have at least a predetermined rate of change within the plural points in time.

2. The device according to claim 1, wherein the optical sensing component is configured to record, as the pattern, an image of an interference pattern of light received from the surface of the object.

3. The device according to claim 2, wherein the optical sensing component is configured to record the plurality of images of the interference pattern within an image frame at the plural points in time, and wherein the processing component is configured to determine the temporal changes in the interference pattern by comparing the plurality of images and calculating changes in position of the interference pattern in the image frame between the plurality of images.

4. The device according to claim 3, wherein the processing component is configured to calculate changes in position of the interference pattern by overlapping at least two of the images and determining an amount of displacement of the overlapped images with respect to each other during the plural points in time.

5. The device according to claim 4, wherein the processing component is configured to determine the amount of displacement of the overlapped images based on respective intensities of the images and a relative motion of the respective intensities of the images with respect to each other during the plural points in time.

6. The device according to claim 5, wherein the processing component is configured to determine the amount of displacement of the overlapped images based on an amount of relative motion of the respective intensities with respect to Cartesian coordinates.

7. The device according to claim 3, wherein the processing component is configured to identify a plurality of segments in each of the images, respectively, and to calculate changes in position in the interference pattern by calculating changes in position of corresponding identified segments in the plurality of images.

8. The device according to claim 7, wherein the processing component is configured to associate each of the identified segments with position information indicating a respective position within the image frame in each corresponding image, and to determine whether the corresponding position information for at least one of the identified segments in a first one of the plurality of images changes with respect to the corresponding position information for the at least one of the identified segments in a second one of the plurality of images recorded subsequent to the first one of the plurality of images.

9. The device according to claim 8, wherein the processing component is configured to determine whether the corresponding position information for the at least one of the identified segments in the first one of the plurality of images changes with respect to a predetermined number of the plurality of images.

10. The device according to claim 8, wherein the position information includes Cartesian coordinates within the image frame for the corresponding identified segment.

11. The device according to claim 8, wherein the position information includes a measured position of the corresponding identified segment in relation to a known position of at least one other identified segment in the corresponding image.

12. The device according to claim 8, wherein the processing component is configured to calculate a frequency of change for each of the corresponding identified segments in the plurality of images.

13. The device according to claim 1, wherein the processing component is configured to detect non-visible contents of the object by determining which of the corresponding identified segments in the plurality of images have at least the predetermined rate of change during the plural points in time.

14. The device according to claim 13, wherein the processing component is configured to determine motion of the non-visible content of the object in a first direction and in a second direction transverse to the first direction.

15. The device according to claim 13, wherein the processing component is configured to detect a frequency of vibration in the non-visible content based on the determined rate of change of corresponding segments in the image frame within the plural points in time.

16. The device according to claim 1, wherein the optical sensing component includes a camera configured to record respective images of the pattern received from the first surface at the plural points in time.

17. The device according to claim 16, wherein the optical sensing component is configured to record a first image of the first interference pattern received from the first surface of the object based on the first laser light, to record a second image of the second interference pattern from the second surface of the object based on the second laser light, to record a plurality of the first images of the first interference pattern within a first image frame at the plural points in time, and to record a plurality of the second images of the second interference pattern within a second image frame at the plural points in time.

18. The device according to claim 17, wherein the processing component is configured to:

determine the temporal changes in the first interference pattern by comparing the plurality of first images and calculating changes in position of the first interference pattern in the first image frame between the plurality of first images;

determine the temporal changes in the second interference pattern by comparing the plurality of second images and calculating changes in position of the second interference pattern in the second image frame between the plurality of second images; and determine whether the temporal changes in the first interference pattern are greater or less than the temporal changes in the second interference pattern.

19. The device according to claim 18, wherein the processing component is configured to identify a plurality of segments in each of the first and second images of the first and second interference patterns, respectively, and to identify segments in the first images which respectively correspond to segments in the second images, and wherein the processing component is configured to detect temporal changes in the first and second interference patterns by calculating changes in position in the corresponding segments of the plurality of first and second images during the plural points in time.

20. The device according to claim 19, wherein the processing component is configured to:

record position information for each segment identified in each of the first and second images, respectively, calculate changes in position of the corresponding segments by determining whether position information of the corresponding segments of the plurality of first and second images changes during the plural points in time, and detect whether motion is present in the object based on the calculated changes in position of the corresponding segments of the plurality of first and second images.

21. The device according to claim 1, wherein the optical sensing component comprises a plurality of sensors each configured to detect a corresponding proximity of a plurality of segments of the pattern with respect to the sensors over the plural points in time, and wherein the processing component is configured to determine temporal changes in the pattern during the plural points in time by determining whether each segment has a predetermined displacement between the recorded patterns.

22. The device according to claim 1, wherein the optical sensing component includes a light sensitive area configured to receive the pattern of light from the surface of the object, wherein the optical sensing component is configured to output a signal proportional to changes in the pattern of light incident on the light sensitive area of the detector, and wherein the processing component is configured to determine temporal changes in the pattern during the plural points in time based on the output signal of the optical sensing component.

23. The device according to claim 21, wherein the processing component is configured to determine temporal changes in the pattern by calculating an amount of change in the output signal of the optical sensing component.

24. The device according to claim 1, wherein the processing component is configured to detect motion within a predetermined frequency range.

25. A method for detecting non-visible content of an object in a non-contact manner, the method comprising:

emitting light from a light source toward a surface of an object over a period of time, wherein the light source includes a first laser configured to emit a first laser light toward a first surface of the object, and a second laser light source configured to emit a second laser light at a second surface of the object;

receiving, by an optical sensing component, a pattern of light from the surface of the object, and to record the received pattern of light at plural points in time, wherein the received pattern of light includes a first interference pattern received from the first surface of the object based on the first laser light, and a second interference pattern received from the second surface of the object based on the second laser light; and determining, by a processor of a computer processing device, temporal changes in the pattern of light during the plural points in time; and detecting, by the processor, whether motion is present in the object based on determined temporal changes in the pattern of light, the motion representing a frequency source of non-visible content in the object, wherein the optical sensing component is configured to record a plurality of images of the received pattern at the plural points in time, and the processing component is configured to calculate motion of corresponding identified segments in the plurality of images by determining which of the identified segments have at least a predetermined rate of change within the plural points in time.

26. The method according to claim 25, comprising:

recording, as the pattern, an image of an interference pattern of light received from the surface of the object; and recording a plurality of the images of the interference pattern at the plural points in time.

27. The method according to claim 26, wherein the optical sensing component is configured to record the plurality of images of the interference pattern within an image frame at the plural points in time, and wherein the processing component is configured to determine the temporal changes in the interference pattern by comparing the plurality of images and calculating changes in position of the interference pattern in the image frame between the plurality of images.

28. A non-transitory computer-readable recording medium having a computer program tangibly recorded thereon that, when executed by a processor of a computer processing device, causes the processor to carry out operations for detecting non- visible content of an object in a non-contact manner, the operations comprising:

emitting light toward a surface of an object over a period of time, wherein the light source includes a first laser configured to emit a first laser light toward a first surface of the object, and a second laser light source configured to emit a second laser light at a second surface of the object;

receiving a pattern of light from the surface of the object, and to record the received pattern of light at plural points in time, wherein the received pattern of light includes a first interference pattern received from the first surface of the object based on the first laser light, and a second interference pattern received from the second surface of the object based on the second laser light; and determining temporal changes in the pattern of light during the plural points in time; and detecting whether motion is present in the object based on determined temporal changes in the pattern of light, the motion representing a frequency source of non-visible content in the object, wherein the optical sensing component is configured to record a plurality of images of the received pattern at the plural points in time, and the processing component is configured to calculate motion of corresponding identified segments in the plurality of images by determining which of the identified segments have at least a predetermined rate of change within the plural points in time.

29. A device for detecting non-visible content of an object in a non-contact manner, the device comprising:

a light source configured to emit light toward a surface of an object over a period of time1 wherein the light source includes a first laser configured to emit a first laser light toward a first surface of the object, and a second laser light source configured to emit a second laser light at a second surface of the object;

an optical sensing component configured to receive a pattern of light from the surface of the object, and to record the received pattern of light at plural points in time, wherein the received pattern of light includes a first interference pattern received from the first surface of the object based on the first laser light, and a second interference pattern received from the second surface of the object based on the second laser light; and a processing component configured to define the pattern recorded at at least one of the plural points in time as a reference pattern, to determine temporal changes in the pattern of light during the plural points in time by comparing the pattern of light during the plural points in time with the reference pattern, and to detect whether motion is present in the object when determined temporal changes in the pattern of light differ a predetermined amount the reference pattern, the motion representing non-visible content in the object, wherein the optical sensing component is configured to record a plurality of images of the received pattern at the plural points in time, and the processing component is configured to calculate motion of corresponding identified segments in the plurality of images by determining which of the identified segments have at least a predetermined rate of change within the plural points in time.

* * * * *